United States Patent
Dundas et al.

(10) Patent No.: US 9,249,824 B2
(45) Date of Patent: Feb. 2, 2016

(54) LOCKING NUT FOR TOILET SEAT

(71) Applicant: CENTOCO PLASTICS LIMITED, Windsor (CA)

(72) Inventors: Garnet Dundas, Wheatley (CA); Saverio Paonessa, Belle River (CA); Maoxin Gong, Windsor (CA)

(73) Assignee: Centoco Plastics Limited (CA)

( * ) Notice: Subject to any disclaimer, the term of this patent is extended or adjusted under 35 U.S.C. 154(b) by 8 days.

(21) Appl. No.: 14/259,768

(22) Filed: Apr. 23, 2014

(65) Prior Publication Data

US 2015/0050098 A1  Feb. 19, 2015

Related U.S. Application Data

(60) Provisional application No. 61/866,108, filed on Aug. 15, 2013.

(51) Int. Cl.
| | |
|---|---|
| *F16B 31/02* | (2006.01) |
| *F16B 39/22* | (2006.01) |
| *F16B 37/04* | (2006.01) |
| *F16B 37/14* | (2006.01) |

(52) U.S. Cl.
CPC ............... *F16B 39/22* (2013.01); *F16B 31/02* (2013.01); *F16B 37/043* (2013.01); *F16B 37/14* (2013.01)

(58) Field of Classification Search
CPC ............................... F16B 31/02; F16B 39/22
USPC ................................................ 411/6, 7, 326
See application file for complete search history.

(56) References Cited

U.S. PATENT DOCUMENTS

| | | | |
|---|---|---|---|
| 742,282 | A | 10/1903 | Block |
| 1,380,395 | A | 6/1921 | Korach |
| 2,685,812 | A | 8/1954 | Dmitroff |
| 3,273,443 | A | 9/1966 | Rubin |
| 3,275,055 | A | 9/1966 | Gutshall |

(Continued)

FOREIGN PATENT DOCUMENTS

| | | |
|---|---|---|
| DE | 1575249 | 1/1970 |
| WO | 2014066847 A2 | 5/2014 |

OTHER PUBLICATIONS

Lisle Automotive Tools, Lisle 28000 Ratcheting Lock Nut Tool [online] [retrieved on Sep. 16, 2013]. Retrieved from the internet: URL: http://www.dynamitetoolco.com/Lisle-28000-Ratcheting-Lock-Nut_Tol-p/lil-28000.htm>.

(Continued)

*Primary Examiner* — Flemming Saether
(74) *Attorney, Agent, or Firm* — Dykema Gossett PLLC

(57) ABSTRACT

A locking nut includes a nut top, a nut middle, and a slip section. The nut top includes an integrally-formed bushing. The nut middle includes a threaded central bore suitable for threaded engagement on a threaded installation bolt, as well as a plurality of ratchet gears on an outer surface where each gear has a respective first slip surface and a first drive surface. The slip section includes a plurality of cantilevered posts having a respective free end, wherein on each post are formed a respective second slip surface and a second drive surface. When the slip section is rotated in a tightening direction, the slip section and the nut middle rotate together until a torque threshold is reached, where the second slip surfaces override the first slip surfaces to limit the applied torque. The locking nut includes structure to produce sound when the torque threshold has been reached.

20 Claims, 16 Drawing Sheets

(56) References Cited

U.S. PATENT DOCUMENTS

| | | | |
|---|---|---|---|
| 3,280,689 A * | 10/1966 | Rubin | 411/6 |
| 3,289,524 A | 12/1966 | Rubin | |
| 3,368,602 A | 2/1968 | Boyd | |
| 3,419,057 A | 12/1968 | Hogan | |
| 3,425,314 A | 2/1969 | Ohlson | |
| 3,460,428 A | 8/1969 | Charles | |
| 3,825,051 A | 7/1974 | Sigmund | |
| 3,841,177 A | 10/1974 | Watterback | |
| 4,067,371 A | 1/1978 | Stencel | |
| 4,176,582 A | 12/1979 | Witte | |
| 4,518,295 A | 5/1985 | Matuschek | |
| 4,687,392 A | 8/1987 | Bidwell | |
| 4,904,122 A | 2/1990 | Herbst et al. | |
| 4,911,594 A | 3/1990 | Fisher | |
| 5,092,725 A | 3/1992 | Aittama | |
| 5,215,336 A | 6/1993 | Worthing | |
| 5,256,015 A | 10/1993 | St. Clair | |
| 5,362,110 A * | 11/1994 | Bynum | 285/87 |
| 5,397,168 A | 3/1995 | Hand | |
| 5,533,852 A | 7/1996 | Matthews | |
| 5,606,753 A | 3/1997 | Hashimoto | |
| 5,642,972 A | 7/1997 | Ellis et al. | |
| 5,653,481 A * | 8/1997 | Alderman | 285/363 |
| 5,688,088 A | 11/1997 | Watterback | |
| 5,713,708 A | 2/1998 | Van DerDrift et al. | |
| 5,967,721 A | 10/1999 | Giachinta et al. | |
| 6,082,941 A * | 7/2000 | Dupont et al. | 411/7 |
| 6,227,782 B1 | 5/2001 | Bowling et al. | |
| 6,557,900 B1 | 5/2003 | Austin | |
| 6,679,663 B2 | 1/2004 | DiStasio et al. | |
| 6,764,326 B2 | 7/2004 | Matsumoto et al. | |
| 7,029,216 B2 | 4/2006 | McKay | |
| 8,074,334 B2 | 12/2011 | Tharp et al. | |
| 8,353,418 B2 | 1/2013 | Bork | |
| 8,764,361 B2 | 7/2014 | Seaman et al. | |
| 2007/0071570 A1 | 3/2007 | Smolarek et al. | |
| 2008/0209620 A1 | 9/2008 | Hand et al. | |
| 2009/0276944 A1 | 11/2009 | Hand et al. | |
| 2011/0014004 A1 | 1/2011 | Yasui | |
| 2012/0266446 A1 | 10/2012 | Leibfried | |
| 2013/0216328 A1 | 8/2013 | Leibfried et al. | |

OTHER PUBLICATIONS

Torque-Rite 50 in. lb nut [online] [retrieved on Sep. 16, 2013]. Retrieved from the internet: <URL: http://www.dixonvalve.com/product/13TR-50.html>.

* cited by examiner

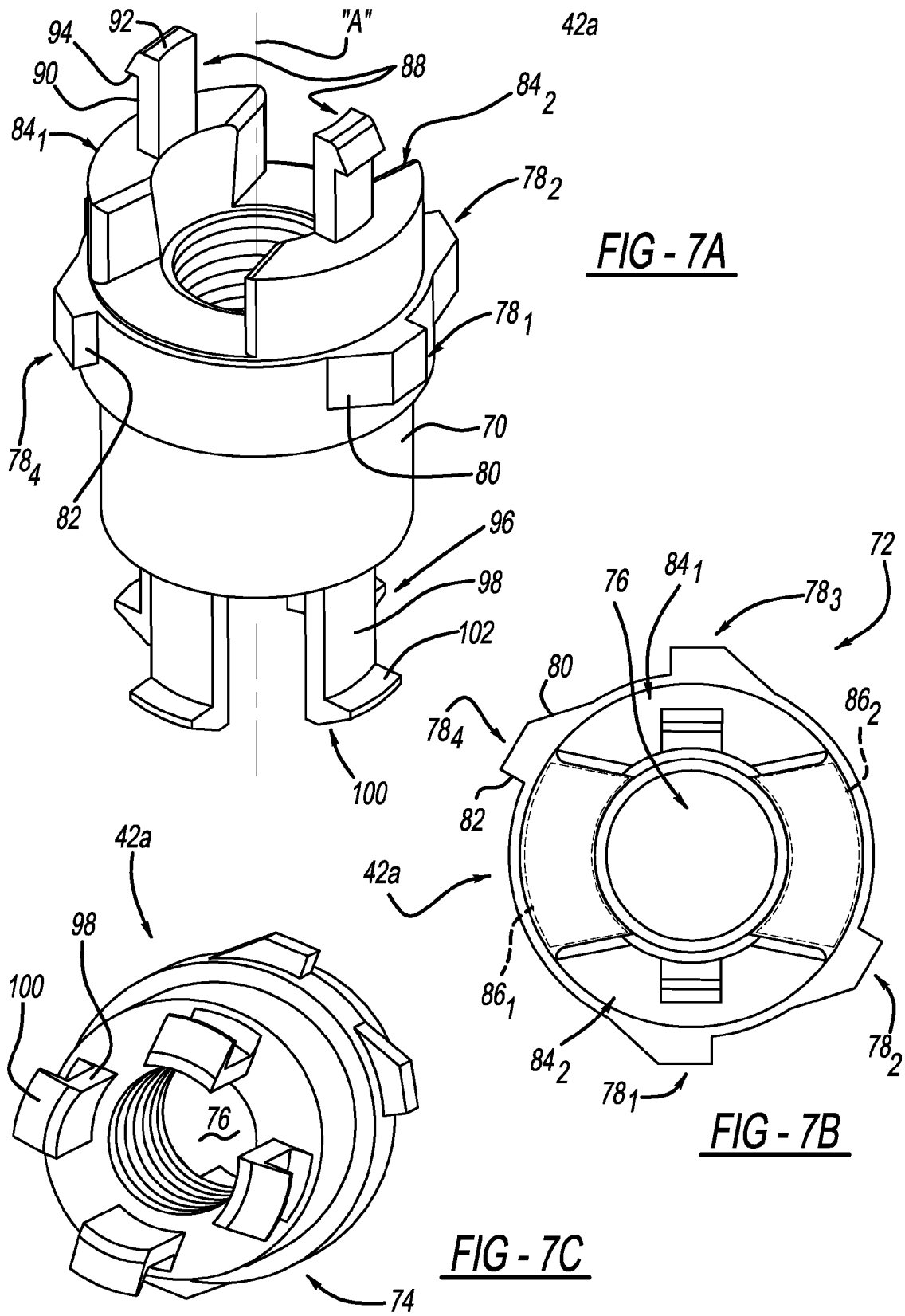

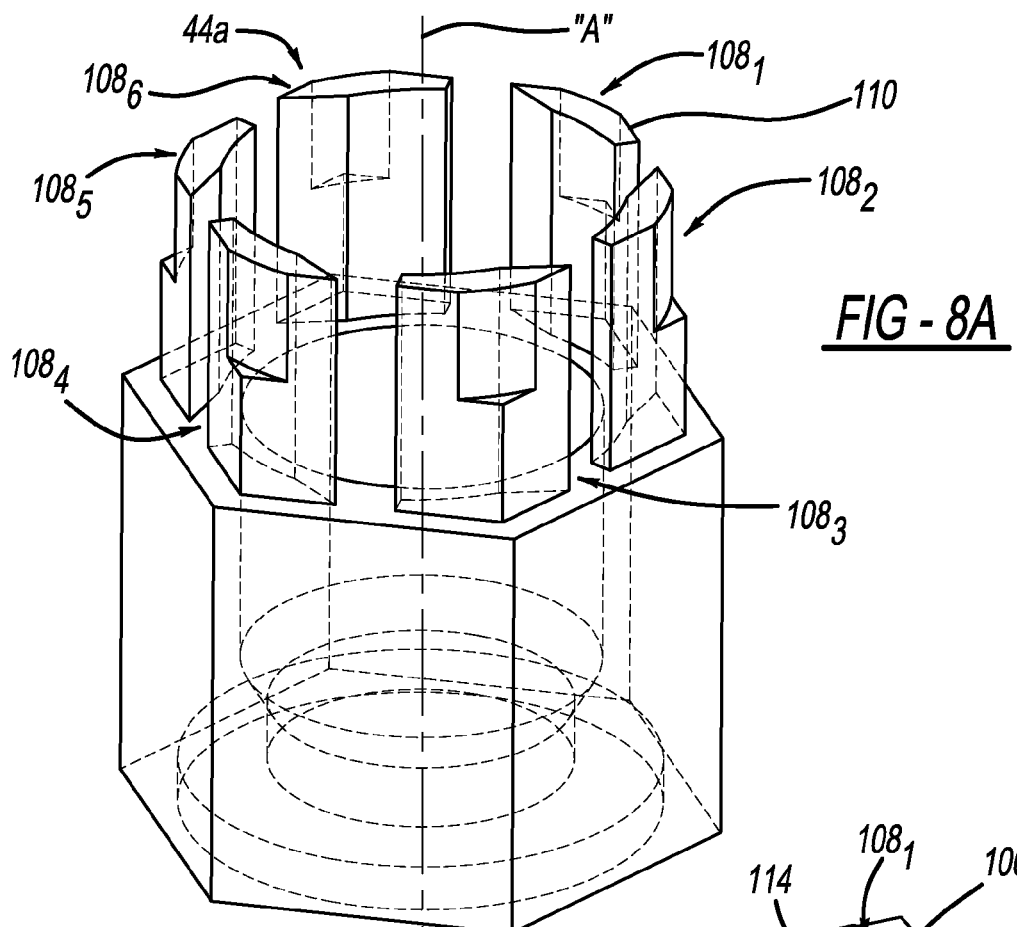
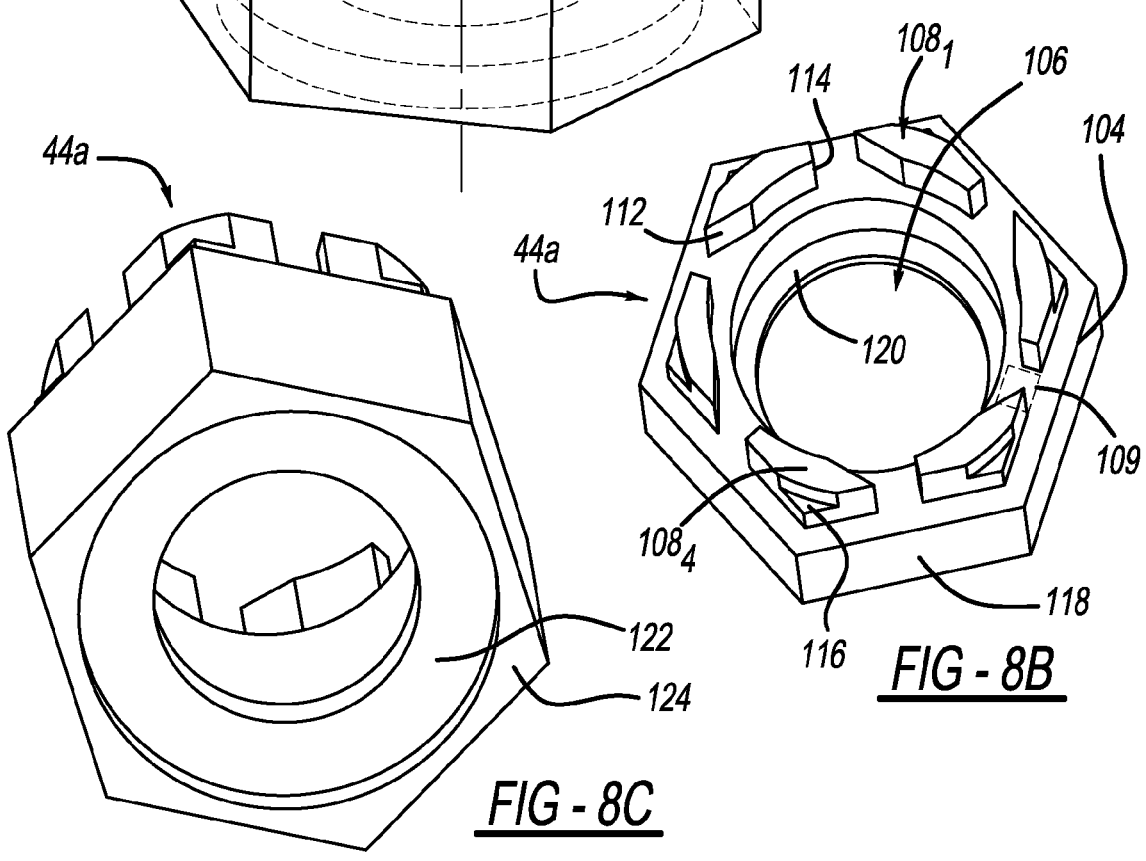

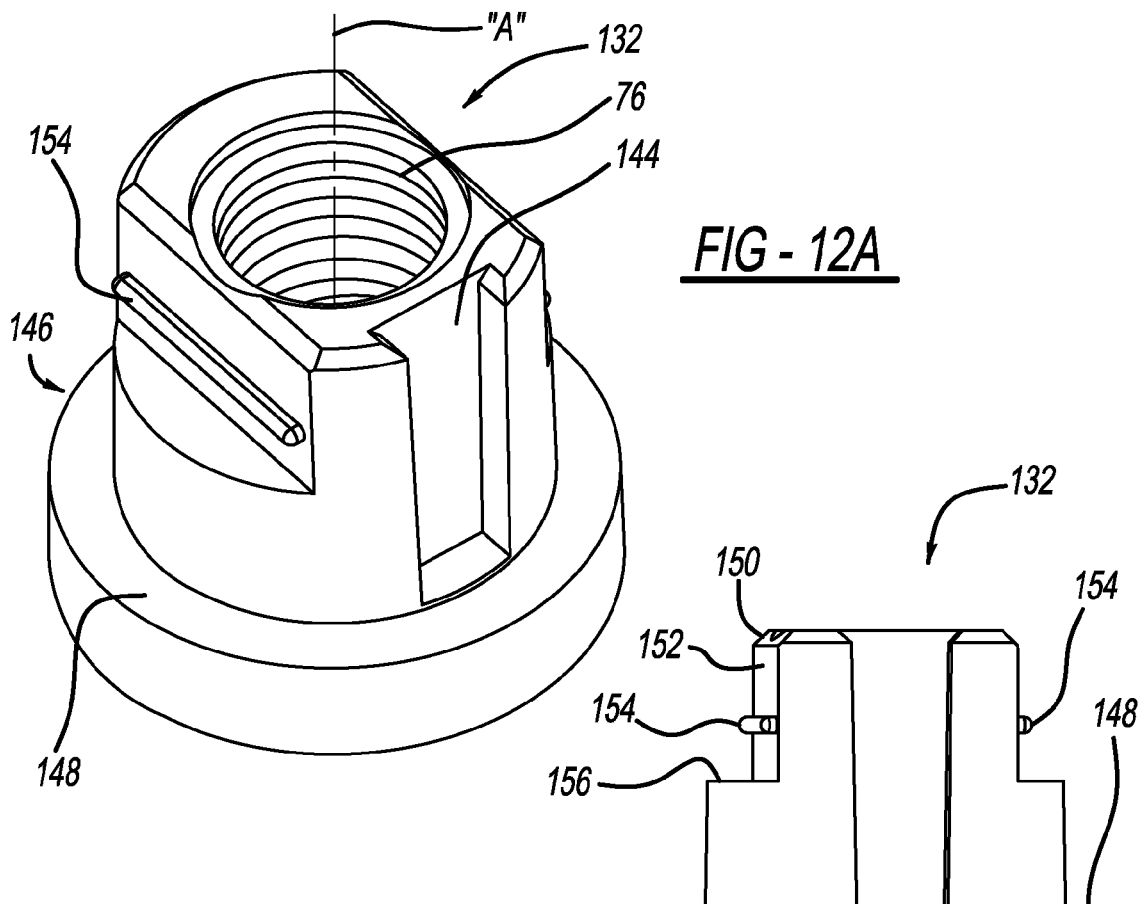
*FIG - 12A*
*FIG - 12B*
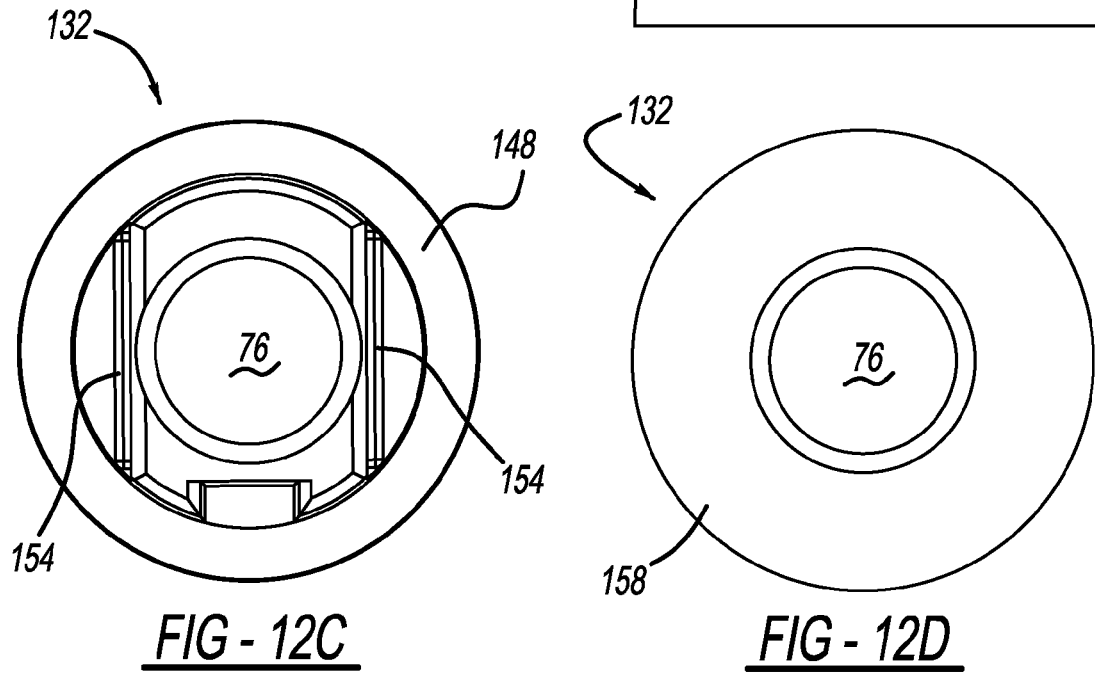
*FIG - 12C*
*FIG - 12D*

LOCKING NUT FOR TOILET SEAT

CROSS-REFERENCE TO RELATED APPLICATIONS

This application claims the benefit of U.S. provisional application No. 61/866,108, filed 15 Aug. 2013 (the '108 application), which is hereby incorporated by reference as though fully set forth herein.

BACKGROUND a. Technical Field

The instant disclosure relates generally to a locking nut, and more particularly to locking nut configurations that cooperate with a corresponding threaded bolt to retain a hinge used to releasably attach a toilet seat to a toilet bowl.

b. Background Art

It is known to provide a toilet seat ring and cover assembly with an integrated hinging mechanism for attachment to a toilet bowl. In this regard, known configurations involve attaching the hinging mechanisms to the bowl using a bolt or the like and a companion fastener. A problem arises, however, in that the fastener can loosen over time due to, for example, repeated raising and lowering of the hinged toilet seat.

One known approach to address this problem involves providing a rubber washer or gasket between the fastener and the underside of the toilet bowl. However, unless the fastener is tightened sufficiently, use of such rubber washers/gaskets may be ineffective at preventing loosening. Other approaches involve mechanisms to ensure that the fastener is tightened to at least a predetermined, minimum torque. However, some of these approaches are complicated and may not be optimized for use in securing a toilet seat hinge.

Accordingly, there remains a need for an improved fastener. It should be understood that the foregoing description is intended only to illustrate the present field and is therefore exemplary only and not limiting in nature in any respect.

BRIEF SUMMARY

One advantage of an apparatus, such as a locking nut, for securing a bolt according to the instant disclosure is that the locking nut limits the amount of torque to a predetermined, maximum amount. This in turn allows the user to tighten the locking nut without the risk of over-tightening (which can damage the nut and/or bolt) but can also can provide an indication that the locking has been tightened adequately. In addition, in an embodiment, an integrally-formed inclined surface on the top of the locking nut can act as a bushing, which in turn can reduce or eliminate "play" of the bolt in an oversize installation hole formed in the toilet bowl.

According to an embodiment, an apparatus is configured to secure a threaded bolt to a toilet bowl and has a longitudinal axis associated therewith. The apparatus includes a nut top, a nut middle, and a slip section. The nut top includes an aperture disposed along the axis and has an inclined surface on a first axial side (e.g., the top or facing in the "up" direction) and an outer wall axially-extending on a second axial side of the nut top (e.g., the bottom or facing in the "down" direction). The nut middle has a threaded through-bore extending along the axis that includes threads configured to mesh with those of the threaded bolt. The nut middle also includes a plurality of circumferentially-arranged ratchet gears on an outer surface thereof. Each of the ratchet gears includes a respective first slip surface and a respective first drive surface. The slip section has a cylindrical-shaped body with an opening in which a portion of the nut middle is disposed. The slip section also includes a plurality of axially-extending and circumferentially-arranged posts. Each post has a respective free end disposed radially-inwardly of the outer wall of the nut top (i.e., when the nut top, nut middle, and slip section are all assembled). Each post also has a respective second slip surface and a respective second drive surface.

In a first state of the apparatus, the first slip surfaces of the ratchet gears engage the second slip surfaces of the posts while the first drive surfaces of the ratchet gears engage the second drive surfaces of the posts. In operation (e.g., tightening), in a second state of the apparatus, when a first torque in a first rotational orientation is applied to the slip section relative to the nut middle reaches a predetermined threshold, the second slip surfaces of the posts slide relative to, over and off of the first slip surfaces of the ratchet gears. In further operation (e.g., loosening), in a third state of the apparatus, when a second torque in a second rotational orientation opposite of the first rotational orientation is applied to the slip section relative to the nut middle, the second drive surfaces of the posts engage the first drive surfaces of the ratchet gears to rotate the nut middle.

The foregoing and other aspects, features, details, utilities, and advantages of the present disclosure will be apparent from reading the following description and claims, and from reviewing the accompanying drawings.

BRIEF DESCRIPTION OF THE DRAWINGS

FIGS. 7A-7C are side, top, and bottom views of a nut middle portion of the three-piece embodiment of FIG. 5.

FIGS. 8A-8C are side, top, and bottom views of a slip section portion of the three-piece locking nut embodiment of FIG. 5.

FIGS. 12A-12D are isometric side, plan side, top, and bottom views of a lower nut middle portion of the four-piece locking nut embodiment of FIG. 10.

DETAILED DESCRIPTION

This disclosure relates to embodiments of an apparatus, hereinafter sometimes referred to as a locking nut, configured to secure a threaded bolt and/or a bolt and hinge assembly to a toilet bowl. The apparatus includes a number of features, including a torque slip feature which limits the maximum amount of torque applied to the locking nut (relative to the bolt) to a predetermined maximum torque. This feature minimizes or eliminates over-tightening, as well as provides a mechanism to ensure that the locking is adequately tightened (i.e., the user will tighten the locking nut until the slip mechanism has been actuated, thereby ensuring that the minimum torque has been reached). In a further embodiment, a sound indicating feature may be employed that emits an audible "click" or other sound that can be perceived by the user when the slip mechanism has been actuated, thereby providing feedback to the user that the locking nut has been adequately tightened.

Figures 1, 2:
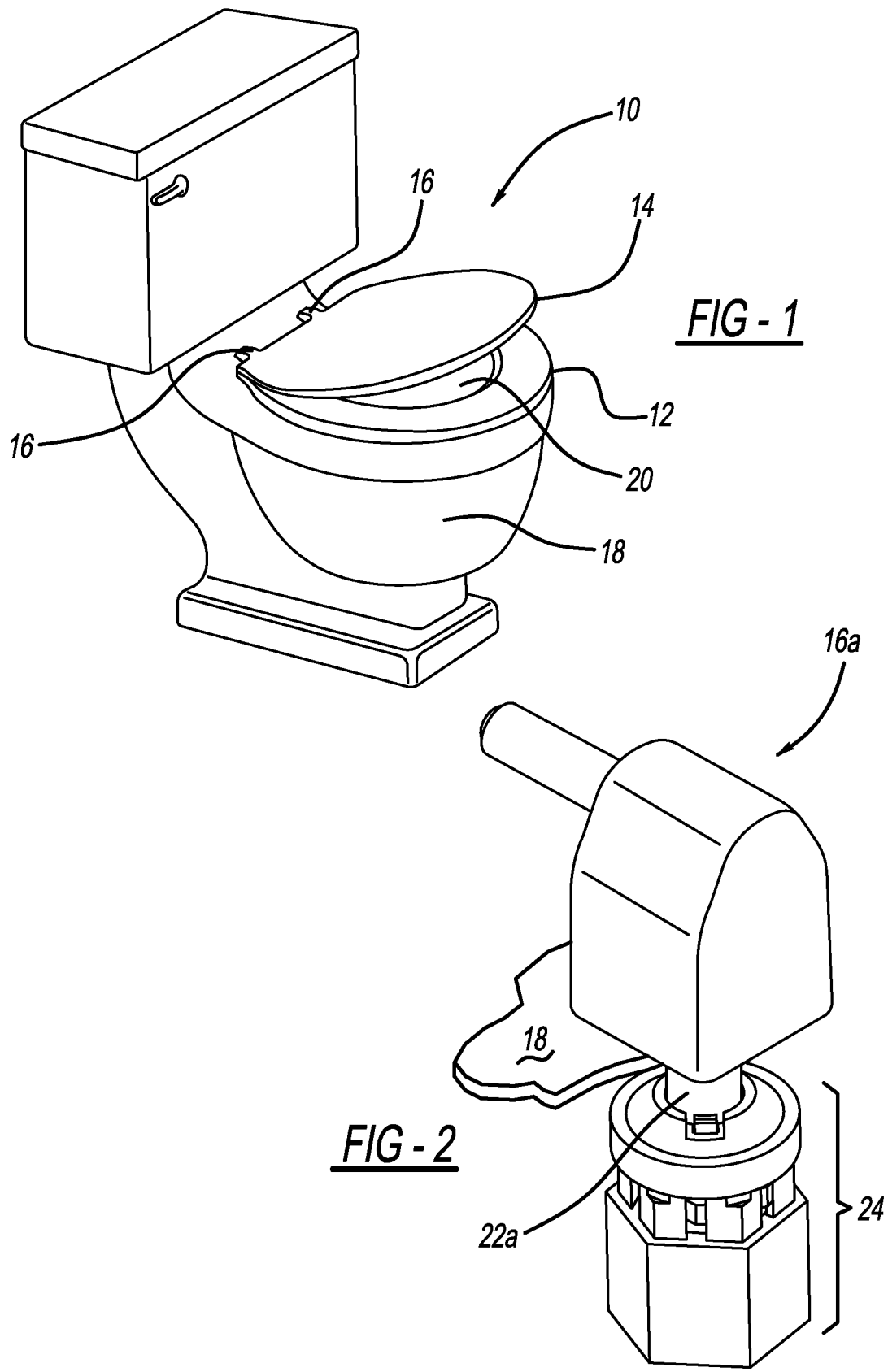
FIG. 1 is a diagrammatic view of a toilet seat assembly coupled to a toilet bowl.
FIG. 2 is a diagrammatic view showing a bolt and hinge assembly fastened to a toilet bowl using an apparatus (locking nut) according to an embodiment.

Referring now to the drawings wherein like reference numerals are used to identify identical or similar components in the various views, FIG. 1 is a diagrammatic view of a toilet seat assembly 10 which may be secured using locking nut embodiments disclosed herein. The toilet seat assembly 10 may include a toilet seat ring 12, a toilet seat cover 14, and one or more toilet seat hinges 16. As shown, toilet seat assembly 10 is configured for attachment to a toilet bowl 18 or a portion thereof (e.g., as shown, the relatively flat portion near the tank, as is conventional practice).

Toilet seat ring 12 may be a closed ring, with a generally oval opening 20, although it should be understood that toilet seat ring 12 may comprise other configurations (e.g., a U-shaped ring configuration with the open portion of the U-shaped ring facing toward the forward part of toilet bowl 18). The construction details of toilet seat ring 12 may comprise any one of a wide variety of conventional configurations. For example, toilet seat ring 12 may have an inner core portion comprising wood, a wood derivative such as a wood flour composite, compressed fiber laminate, or other cellulosic materials such as hemp. The toilet seat ring 12 may further include a polymeric overlay, for example, polypropylene or other suitable alternative material. Toilet seat ring 12 may include further features (not illustrated), such as multiple bumpers on a lower surface facing the toilet bowl, for example.

Toilet seat cover 14 conceals an opening 20 when toilet bowl 18 is not being used, and may have a similar construction (e.g., core in combination with an overlay) as ring 12, or may be a solid construction, or may be constructed in other ways known in the art.

Toilet seat ring 12 and toilet seat cover 14 may both include further features to provide for a pivotal connection with hinges 16. For example only, both ring 12 and cover 14 may each include hinge ears (not shown) configured for attachment to a respective one of hinges 16. Further details of an exemplary toilet seat ring and cover may be seen by reference to U.S. Pat. No. 6,640,349 entitled "TOILET SEAT", application Ser. No. 09/921,069 filed 2 Aug. 2001, owned by the common assignee of the present invention, and hereby incorporated by reference in its entirety as though fully set forth herein.

FIG. 2 shows an embodiment of a locking nut, designated 24, used to secure a bolt, designated 22a, that is coupled to an industrial hinge 16a, to toilet bowl 18. The toilet bowl 18 is shown as a broken-away, generally flat portion 18. In this embodiment, the hinges 16a may be attached and fixed with the toilet seat (not shown in FIG. 2) using the locking nut 24.

Figure 4:
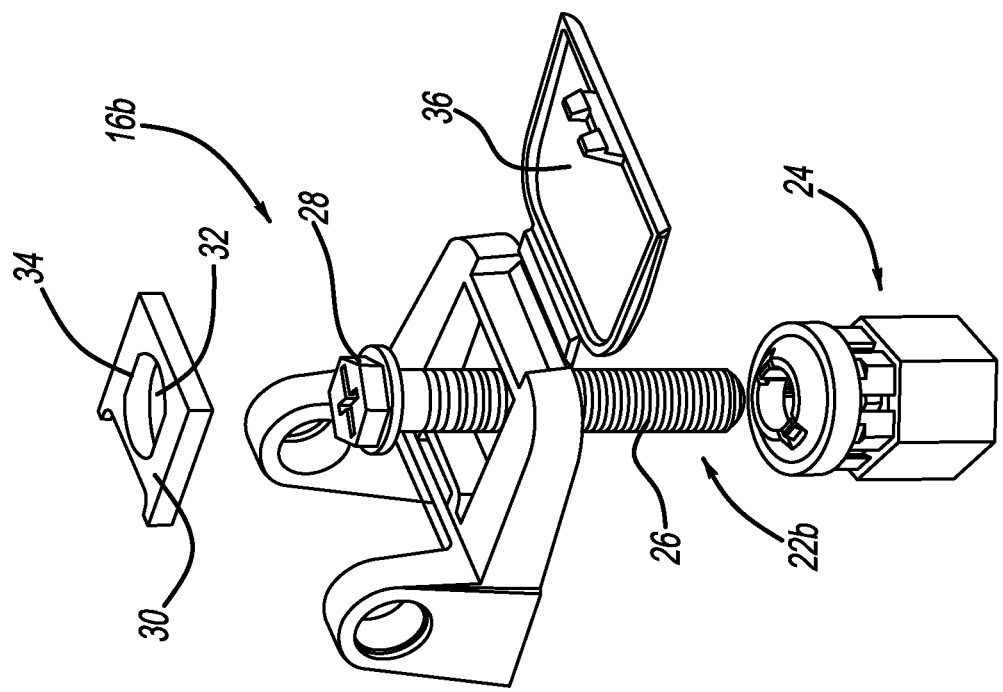
FIGS. 3-4 are isometric views showing a bolt and a top-mount hinge in connection with a locking nut according to an embodiment.
Figure 3:
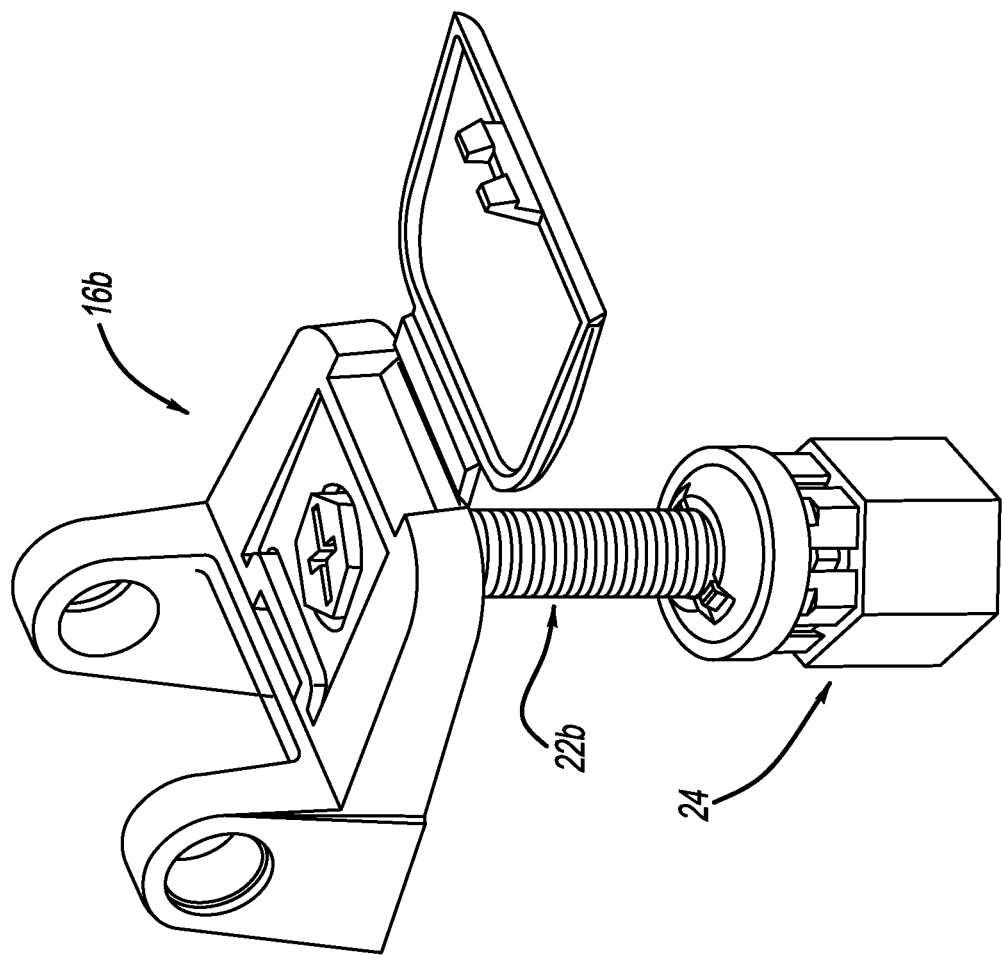

FIGS. 3-4 show the locking nut 24 as used to secure a bolt 22b of the type that is suitable to work with a top-mount hinge 16b having a through-hole through which the bolt 22b passes. Bolt 22b includes a threaded shank 26 extending along a longitudinal axis, and an enlarged head 28 (e.g., shown as having a hex head 28). As shown, the shank 26 can be constructed with external (male) threads that are configured to cooperate with locking nut 24 having corresponding internal (female) threads.

In the illustrated embodiment, the through-hole described above will allow the bolt 22b to freely rotate when the locking nut 24 is being tightening, unless the user uses a tool (e.g., Phillips head screwdriver, or socket/wrench) to prevent rotation of bolt 22b relative to the top-mount hinge while rotating (tightening) the locking nut. In an embodiment, however, a bolt washer 30 is provided that prevents the bolt 22b from rotating together with the locking nut 24 without the need for any tools to hold the bolt head 28. The bolt washer 30 includes an opening 32 that includes opposing flat surfaces 34 that cooperate with the corresponding flat surfaces of the enlarged hex head 28. It should be understood, however, that other configurations (e.g., shapes) may be used to accomplish the same function. In the illustrated embodiment, the top-mount hinge 16b also includes a closure 36 hinged to close the compartment of hinge 16b that houses the head 28 of bolt 22b.

Figure 5:
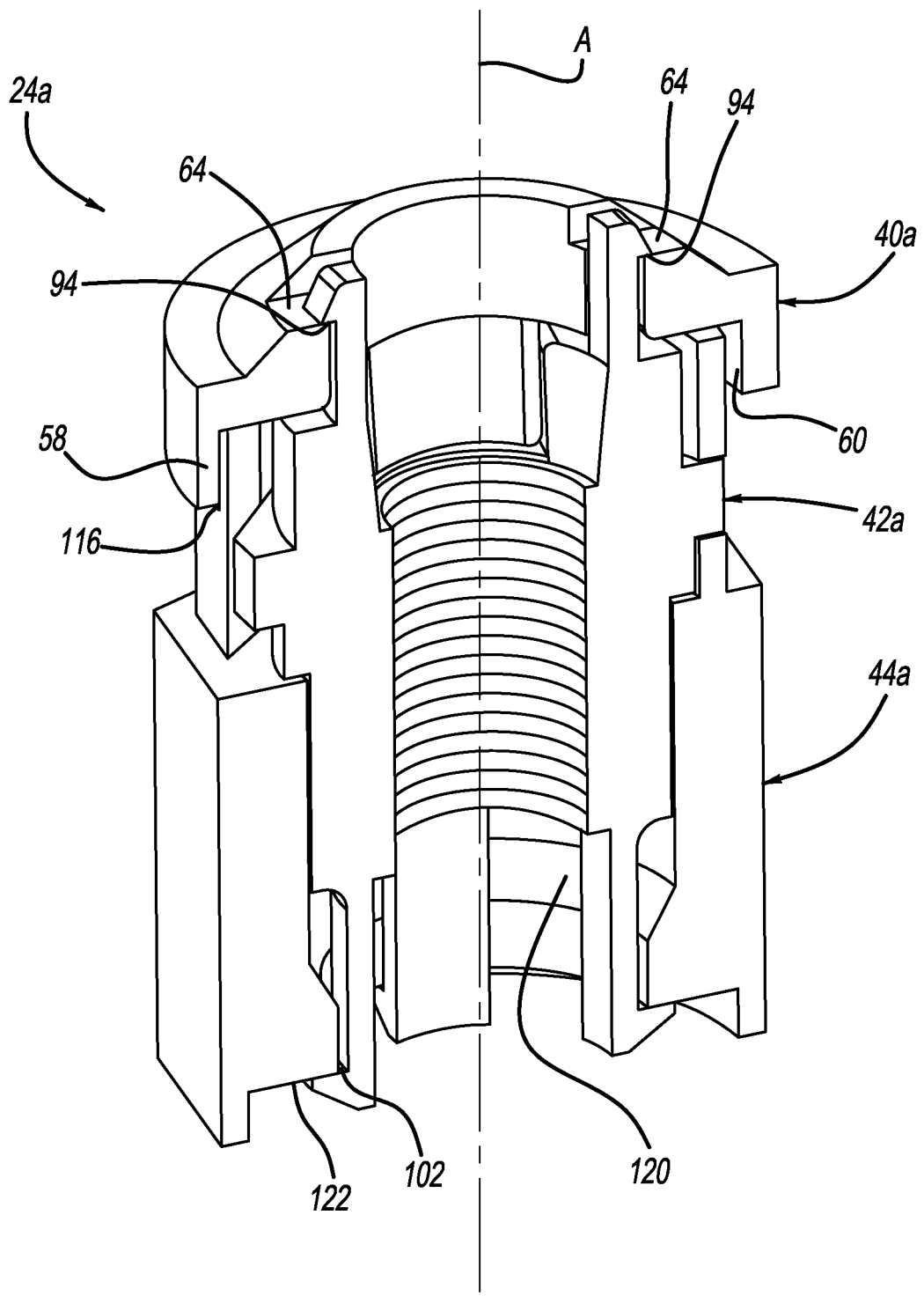
FIG. 5 is a cross-sectional view of a three-piece embodiment of a locking nut for securing a bolt to a toilet bowl.

FIG. 5 is a cross-sectional view of a three-piece embodiment of a locking nut, designated locking nut 24a, in an assembled condition, useful for securing a threaded bolt to a toilet bowl, for example, as described above in exemplary fashion. The locking nut 24a has a longitudinal axis, designated "A" in FIG. 5, which is generally coincident with the longitudinal axis of the bolt 22 (e.g., bolts 22a, 22b) when the locking nut 24a is installed on the bolt 22. In the illustrated embodiment, the locking nut 24a includes a nut top 40a, a nut middle 42a, and slip section 44a, each of which may comprise conventional molding polymers, such as conventional injection molding polymers. Each of the three portions 40a, 42a, 44a of locking nut 24a will be described in turn.

Figure 6A:
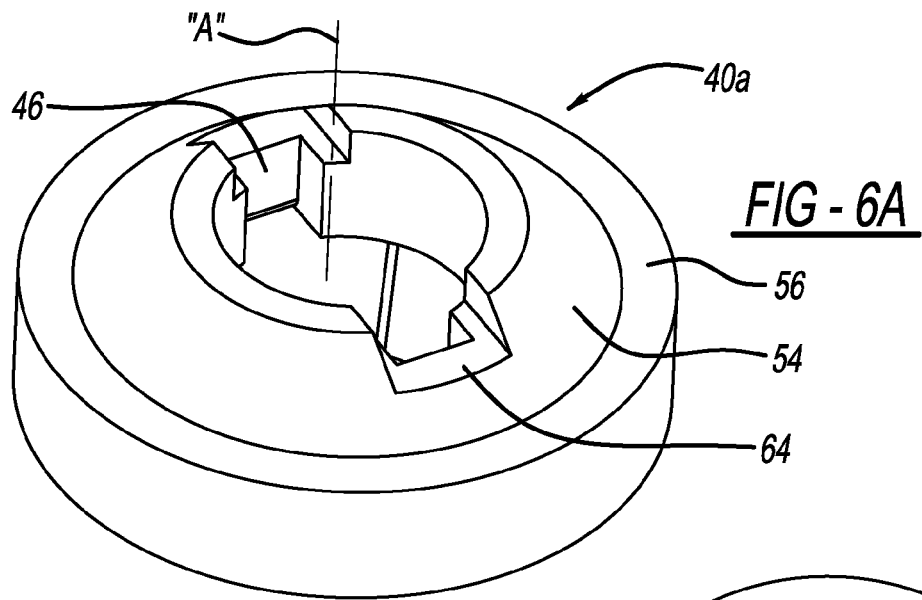
FIGS. 6A-6C are side, top, and bottom views of a nut top portion of the three-piece locking nut embodiment of FIG. 5.
Figure 6B:
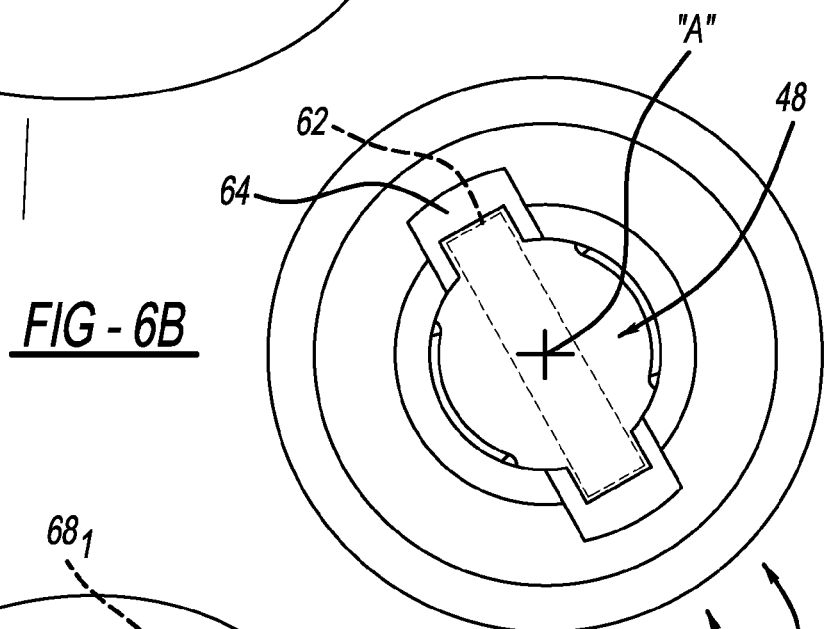
Figure 6C:
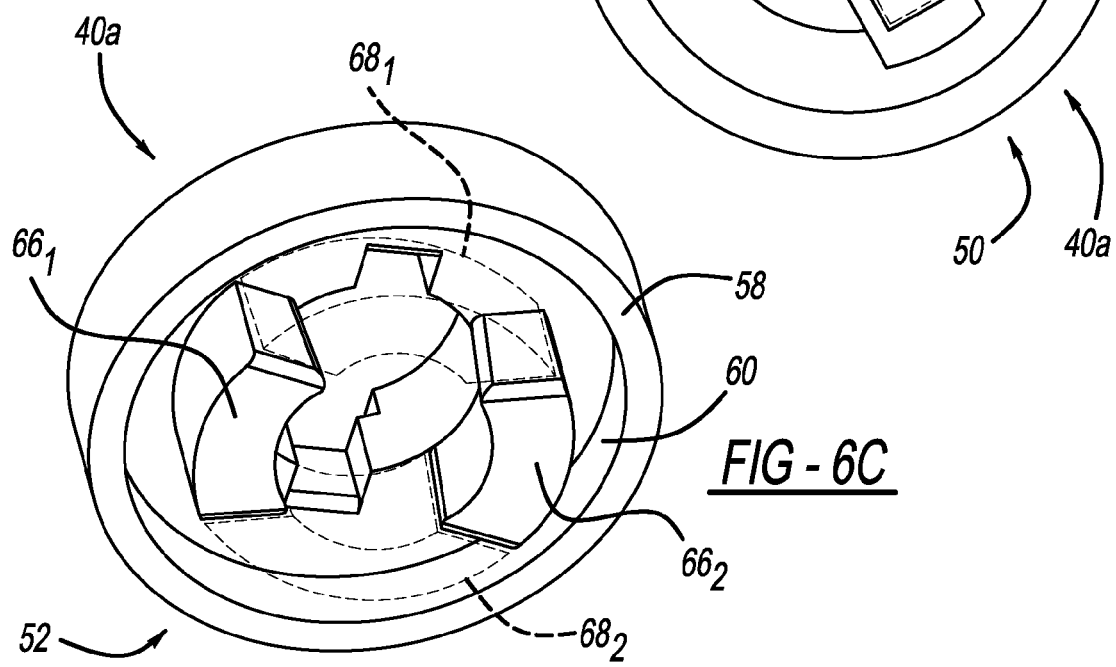

FIGS. 6A-6C are side, top, and bottom views of the nut top 40a. The nut top 40a is generally annular in shape, and includes a main body 46 in which is formed with a central aperture 48 disposed along longitudinal axis "A". For reference, nut top 40a includes a first axial side 50 (e.g., the "top" side or facing in the "up" direction) and a second axial side 52 (e.g., the "bottom" side or facing in the "down" direction) opposite the first axial side 50.

One problem in a typical (conventional) installation involves an undesirable amount of "play" of the installation bolt in the typically oversized installation hole in the toilet bowl. This allows permits the bolt to move around within the hole, and even when a conventional fastener is tightened to the bolt, the large remaining clearance allows for potentially undesired movement. The nut top 40a includes a radially-inwardly, and upwardly sloping inclined surface 54 on the first axial side 50. The nut top 40a also includes a land 56 that is located radially-outwardly of the inclined surface 54. In the illustrated embodiment, the land 56 is generally flat and circumscribes the perimeter of the nut top 40a. The inclined surface 54 is configured to facilitate the centering of the installation bolt within an oversized installation hole, and further acts as a bushing in the final installation. The land 56 provides an engagement surface that abuts the underside of the toilet bowl when installed.

The nut top 40a further includes an outer wall 58 axially-extending downwardly away from the main body 46 on the second axial side 52 (best shown in FIG. 6C). The outer wall 58 is relatively thin and includes an inner surface 60. The outer wall 58 is configured, at least, to limit the deflection of the free ends of posts extending upwardly from the slip section 44a, as will be described below.

The nut top 40a further includes a keying slot 62 (best shown FIG. 6B) and a pair of ledges 64 (only one identified by reference numeral in the figures) adjacent to and on each end of the keying slot 62.

The nut top 40a further includes a plurality of first segments $66_1$, $66_2$ that are axially downwardly projecting from the main body 46 at the second axial side 52 (best shown in FIG. 6C). The plurality of first segments $66_1$, $66_2$ are circumferentially-arranged and are separated by a plurality of intervening first slots $68_1$, $68_2$. The plurality of first segments $66_1$, $66_2$ are configured, in-part, to facilitate alignment of the nut top 40a and the nut middle 42a, as well as to ensure that the nut top 40a rotates with the nut middle 42a.

FIGS. 7A-7C are side, top, and bottom views of the nut middle 42a. The nut middle 42a comprises a generally cylindrical body portion 70 with a first axial side 72 (e.g., a "top" side or facing in the "up" direction) and a second axial side 74 that is opposite of the first axial side 72. The second axial side 74 may be a "bottom" side or face in the "down" direction. The nut middle 42a includes a threaded through-bore 76 extending along longitudinal axis "A". The size and thread pattern of bore 76 is configured to allow installation of the bolt 22 to be inserted and threaded therethrough (i.e., to allow the bolt threads to be in mesh with the bore threads).

The nut middle 42a further includes a plurality (four are shown) of circumferentially-arranged ratchet gears $78_1$, $78_2$, $78_3$, and $78_4$ on an outer surface of nut middle 42a. Each of the ratchet gears $78_1$, $78_2$, $78_3$, and $78_4$ includes a respective first slip surface 80 and a respective first drive surface 82 (for clarity, surfaces 80, 82 are not identified by reference numeral on every ratchet gear $78_i$). As will be described in greater detail below, the slip and drive surfaces on the ratchet gears $78_1$, $78_2$, $78_3$, and $78_4$ are configured to cooperate with like surfaces on cantilevered posts of the slip section 44a, in order to achieve the torque-slip function described herein.

The nut middle 42a further includes a plurality of second segments $84_1$, $84_2$ that are axially upwardly projecting from the main body 70 at the first axial side 72 (best shown in FIG. 7A-7B). The plurality of second segments $84_1$, $84_2$ are circumferentially arranged and are separated by a plurality of intervening second slots $86_1$, $86_2$. The plurality of second segments $84_1$, $84_2$ are configured, in-part, to facilitate alignment of the nut middle 42a with the nut top 40a, as well as to ensure that the nut top 40a rotates with the nut middle 42a. When assembled, the first segments $66_1$, $66_2$ of the nut top 40a are disposed in the second slots $86_1$, $86_2$ and the second segments $84_1$, $84_2$ of the nut middle 42a are disposed in the first slots $68_1$, $68_2$.

The nut middle 42a further includes at least one (two are shown) upper retaining clasps 88. Each upper retaining clasp 88 includes a respective leg 90 that is axially-extending upwards from the first axial side 72 and terminates on a respective free end thereof in a foot 92 with a overhanging lip 94. When the nut top 40a and the nut middle 42a are assembled, the upper retaining clasps 88 extend through the keying slot 62 wherein the lips 94 of each clasp 88 engage a respective ledge 64, to thereby retain the nut top 40a to the nut middle 42a. In the illustrated embodiment, the upper retaining clasps 88 are diametrically opposed.

The nut middle 42a still further includes at least one (four are shown) lower retaining clasps 96. Each lower retaining clasp 96 includes a respective leg 98 that is axially-extending downwardly from the second axial side 74 and terminates on a respective free end thereof in a foot 100 with an overhanging lip 102. The lower retaining clasps 96, as will be described in greater detail below, are configured to cooperate with and couple the nut middle 42a to the slip section 44a.

FIGS. 8A-8C are side, top, and bottom views of the slip section 44a. The slip section 44a has a main, cylindrical-shaped body 104 with a centrally-disposed opening 106 in which at least a portion of the nut middle 42a is disposed when fully assembled. The opening 106 extends along axis "A". The slip section 44a further includes a plurality of (six are shown) axially upwardly-extending and circumferentially-arranged cantilevered posts $108_1$, $108_2$, $108_3$, $108_4$, $108_5$, and $108_6$ separated by a plurality of intervening slots 109 (only one slot 109 is identified in FIG. 8B for clarity). Each cantilevered post $108_1$, $108_2$, $108_3$, $108_4$, $108_5$, and $108_6$ has a respective free end 110 that is (when assembled) disposed radially-inwardly of the outer wall 58 of the nut top 40a (specifically inwardly of inner surface 60). The free ends 110 of the cantilevered posts $108_1$, $108_2$, $108_3$, $108_4$, $108_5$, and $108_6$ each have a respective second slip surface 112 and a respective second drive surface 114. The second slip surface 112 and the second drive surface 114 are disposed on the radially-inwardly facing side of the free ends 110. However, each of the cantilevered posts $108_1$, $108_2$, $108_3$, $108_4$, $108_5$, and $108_6$ may also include, at a respective free end 110, a radially-outwardly facing notch 116.

As shown in FIG. 8B, slip section 44a may further include a downwardly sloping guide surface 120 radially-inwardly extending into the central opening 106. FIG. 8C shows the slip section 44a including a shoulder 122 disposed proximate a bottom surface 124.

The outer surface of the slip section 44a may be further configured with a plurality of generally flat surfaces 118, for example, in a generally-known hex head configuration for facilitating the use of a wrench or other hand tool to tighten the locking nut 24a onto an installation bolt 22.

Referring again to FIG. 3, assembly of the locking nut 24a from the constituent parts 40a, 42a, and 44a involves two basic steps: first, attaching the nut top 40a to the nut middle 42a to form a sub-assembly; and second, attaching the slip section 44a to the sub-assembly.

First Step.

The upper retaining clasps 88 are inserted into the keying slot 62. A slight chamfer on the lower side of the entry (FIG. 6A) of slot 62 slightly deflects the free ends of the upper retaining clasps radially inwardly. As the nut top 40a is pushed down onto the nut middle 42a, the first segments $66_1$, $66_2$ move "down" into open slots $86_1$, $86_2$, while the second segments $84_1$, $84_2$ move "up" into the open slots $68_1$, $68_2$.

When the respective upper free ends of the upper retaining clasps 88 emerge from the keying slot 62, the overhanging lip portions 94 are freed to deflect outwardly, wherein the lips 94 rest on the ledges 64, which effectively couples the nut top 40a and the nut middle 42a together.

Second Step.

The lower retaining clasps 96 are inserted into the central opening 106 of the slip section 44a. As the sub-assembly is moved "down" with respect to the slip section 44a, the free ends of the lower retaining clasps 96 engage guide surface 120, which deflects the feet of the lower retaining clasps 96 radially-inwardly. When the free ends of the lower retaining clasps 96 crest the shoulder 122, the legs 98 deflect or "snap" radially-outwardly wherein the overhanging lips 102 become seated on shoulder 122, thereby coupling and retaining the nut top 40a and the nut middle 42a to the slip section 44a to produce locking nut 24a.

Figure 9:
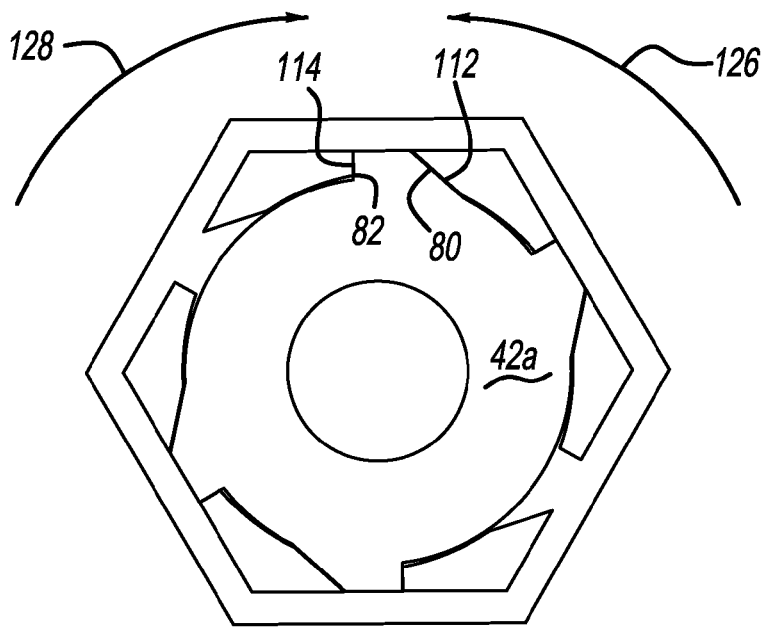
FIG. 9 is a simplified, cross-sectional view of the three-piece locking nut embodiment of FIG. 5, showing engagement of the nut middle ratchet gears and the slip section posts.

FIG. 9 is a simplified, cross-sectional view of the three-piece embodiment of the locking nut 24a, showing engagement of the ratchet gears with the slip section posts. The operation of locking nut 24a will now be set forth.

Operation.

When no torque is applied, the locking nut 24a is in a first state, where the first slip surfaces 80 of the ratchet gears engage the second slip surfaces 112 of the cantilevered posts. Likewise, the first drive surfaces 82 of the ratchet gears engage the second drive surfaces 114 of the cantilevered posts. In operation (e.g., tightening), in a second state of the locking nut 24a, when a first torque in a first rotational orientation 126 (i.e., counterclockwise—CCW) is applied to the slip section 44a relative to the nut middle 42 (which is in mesh with the installation bolt) and reaches a predetermined maximum torque threshold, the second slip surfaces 112 slide relative to, over and off of the first slip surfaces 80. In other words, the posts are configured to deflect, and do deflect within an elastic range at the designed torque limit. In this way, no torque above the threshold can be applied, thereby preventing over-tightening and possible damage to the nut and/or bolt. In further operation (e.g., loosening), in a third state of the locking nut 24a, another torque in a second rotational orientation 128 (i.e., clockwise—CW) opposite of the first rotational orientation 126 is applied to the slip section 44a relative to the nut middle 42a, in which case the second drive surfaces 114 engage the first drive surfaces 82 to rotate the nut middle 42a.

It should appreciated that the respective slip surfaces are inclined relative to one another, thereby providing a mechanism to deflect cantilevered posts sufficiently to allow slip when a designed torque threshold is reached. In contrast, the respective drive surfaces are substantially normal to each other and with respect to the force, thereby minimizing the occurrence of slip.

Figure 10:
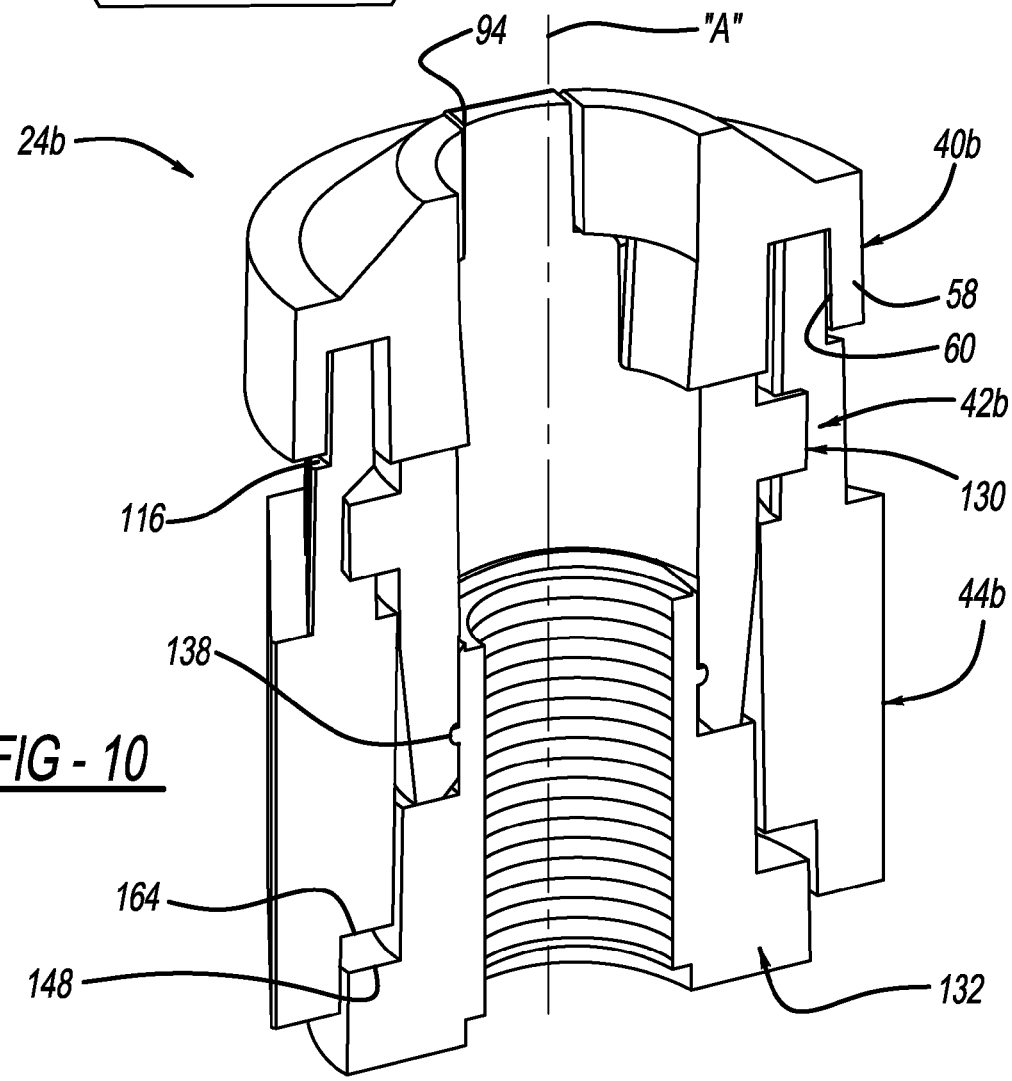
FIG. 10 is a cross-sectional view of a four-piece locking nut embodiment for securing a bolt to a toilet bowl.

FIG. 10 is a cross-sectional view of a four-piece embodiment of a locking nut, designated locking nut 24b, for securing a bolt to a toilet bowl. It should be understood that the description of locking nut 24a made above applies in all regards to locking nut 24b, except as particularly set forth in the description below. Further note that the same or similar features of the locking nuts use the same or similar reference numerals, except for the suffix "a" or "b" (e.g., nut top 24a, and nut top 24b). The locking nut 24b includes a nut top 40b, a nut middle 42b comprising an upper nut middle 130 and a lower nut middle 132, and a slip section 44b.

The nut top 24b may be substantially identical to the nut top 24a, and thus for brevity's sake, the figures and related description for nut top 24b will not be set forth inasmuch as reference may be made to the above description and related figures for nut top 24a.

Figures 11A, 11B, 11C:
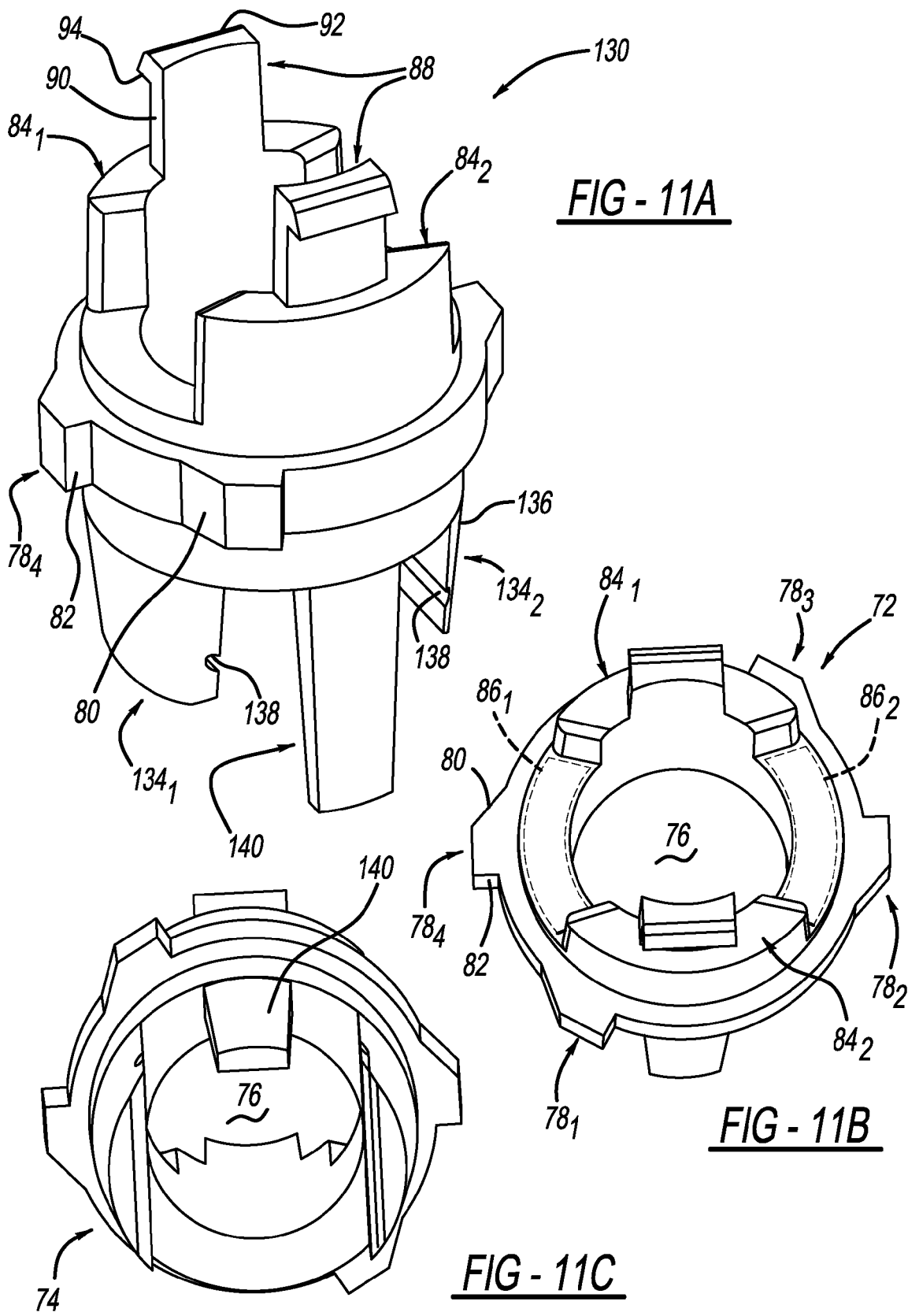
FIGS. 11A-11C are side, top, and bottom views of an upper nut middle portion of the four-piece locking nut embodiment of FIG. 10.

FIGS. 11A-11C are side, top, and bottom views of upper nut middle 130. Upper nut middle 130 includes at least one (two are shown) coupling clasps $134_1$ and $134_2$, which are configured to couple and retain the upper and lower nut middle portions 130, 132 together. Each of the coupling clasps $134_1$ and $134_2$ includes a respective leg 136 and lip 138, which in the illustrated embodiment may include a hemispherical-shaped extreme distal end. The upper nut middle 130 further includes a keying extension 140 configured to align the upper nut middle and lower nut middle portions 130, 132 during assembly. In addition, the upper nut middle 130 includes one or more centering projections 142 configured to center a portion of the upper nut middle 130 in the slip section 44b.

FIGS. 12A-12D are isometric side, plan side, top, and bottom views of lower nut middle 132. The lower nut middle 132 includes, among other things, an alignment slot 144 configured in size and shape to correspond to keying extension 140. Keying extension 140 fits into alignment slot 144 when the upper nut middle 130 and the lower nut middle 132 are assembled, as described in greater detail below.

The lower nut middle 132 further includes an increased diameter flange 146 at a "bottom" axial end thereof, which flange 146 includes an engagement surface 148. Engagement surface 148 is generally flat and lies in a plane that is substantially perpendicular to axis "A".

The lower nut middle 132 further includes tapered surfaces 150, vertical guiding surfaces 152, a pair of coupling recesses 154, and horizontal stop surfaces 156. Features 150, 152, 154, and 156 perform a role in the assembly of upper and lower nut middles 130, 132, which method of assembly will be set forth below. It should be appreciated that in the locking nut 24b, the central bore 76 of the upper nut middle 130 is not threaded, while the central bore 76 of the lower nut middle 132 is threaded. Lower nut middle 132 further includes a lowermost end surface 158 (FIG. 12D).

Figure 13A:
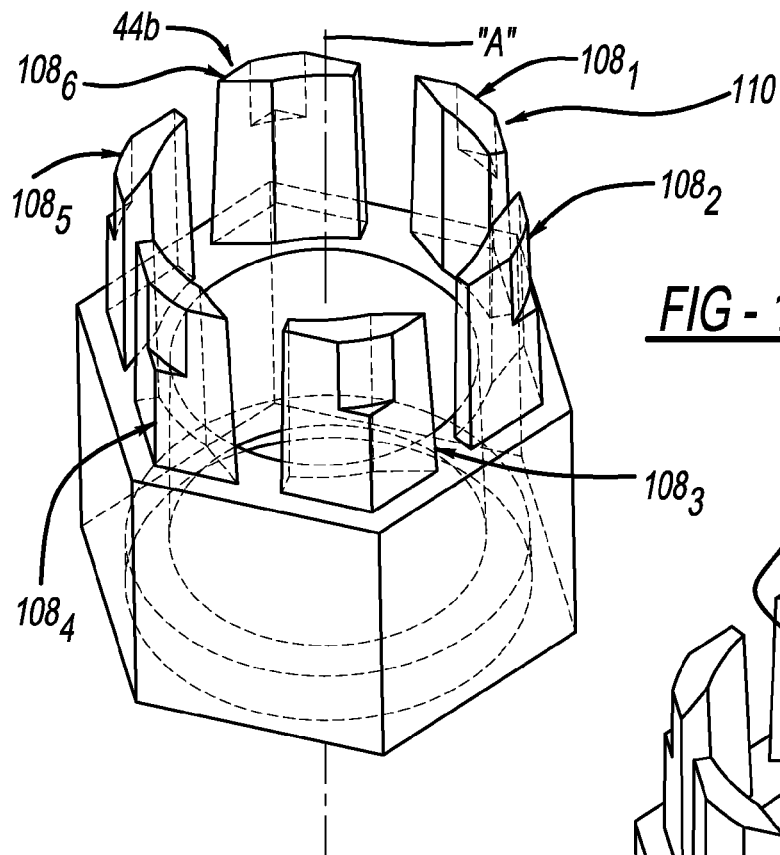
FIGS. 13A-13C are side, top, and bottom views of a slip section portion of the four-piece locking nut embodiment of FIG. 10.
Figure 13B:
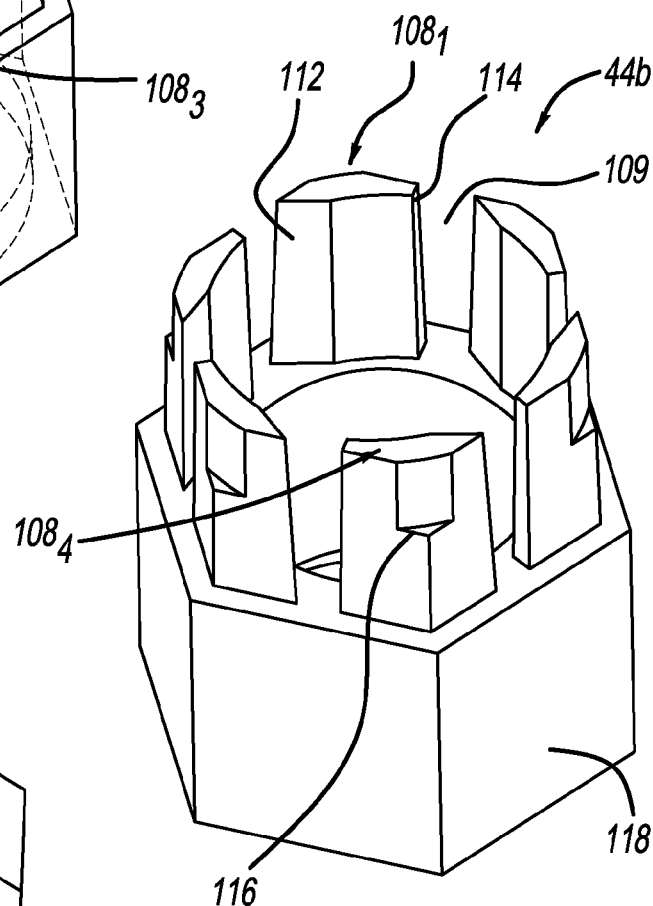
Figure 13C:
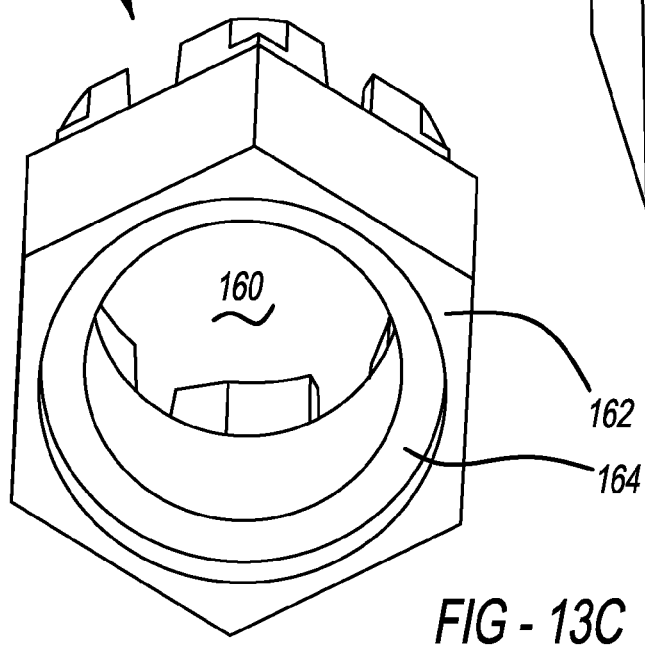

FIGS. 13A-13C are side, top, and bottom views of the slip section 44b. Slip section 44b includes a generally smooth central bore 160 (without the sloping guide surface 120); however, slip section 44b includes a bottom surface 162 and a shoulder 164 radially-inwardly extending but axially offset from surface 164 and radially-outwardly located from opening 160.

Referring again to FIG. 10, assembly of the locking nut 24b from the constituent parts 40b, 42b (items 130, 132), and 44b involves two basic steps: first, attaching the nut top 40b to the upper nut middle 130 to form a sub-assembly; and second, inserting the sub-assembly into the slip section 44b from the top while inserting the lower nut middle into the slip section 44b from the bottom until all the parts are united, as described below.

First Step.

The upper retaining clasps 88 are inserted into keying slot 62 of nut top 40b. A slight chamfer on the lower side of the entry (see FIG. 6A of the identical nut top 40a) slightly deflects the upper retaining clasps 88 inwardly. As the nut top 40b is pushed down onto the upper nut middle 130, the first segments $66_1$, $66_2$, move "down" into the open slots $86_1$, $86_2$, while the second segments $84_1$, $84_2$ move "up" into the open slots $68_1$, $68_2$. When the respective free ends of the upper retaining clasps 88 emerge from the keying slot 62, the overhanging lips 94 are free to deflect outwardly again, wherein the lips 94 rest on the respective ledges 64, which couples the nut top 40b and the upper nut middle 130 together.

Second Step.

The coupling clasps 134₁, 134₂ are inserted into top of the central opening 160 of the slip section 44b, while at the same time, the top of the lower nut middle 132 in inserted into the bottom of the slip section 44b. In this regard, the upper and lower nut middles 130, 132 are rotationally aligned by virtue of the keying extension 140 being disposed into the alignment slot 144. The upper nut middle 130 and the lower nut middle 132 are then forced together—with the slip section 44b being held in the middle. As the upper sub-assembly is moved "down" the free ends of the coupling clasps 134₁, 134₂ engage tapered surfaces 150, which deflects the coupling clasps 96 radially-outwardly. The free ends of the coupling clasps 134₁, 134₂ are thereafter guided along vertical guiding surfaces 152. As the coupling recesses 138 of the coupling clasps 134₁, 134₂ reach and slide over the coupling projections 154, a return force existing in the coupling clasps 134₁, 134₂ (due to the previously-described deflection outwards) causes the projections 154 to snap into the respective recesses 138, and become seated. In addition, cantilevered posts 108 are disposed radially-inwardly of inner surface 160 of wall 158. The wall 158 restrains outward deflection of the free ends of the posts 108.

Figure 14:
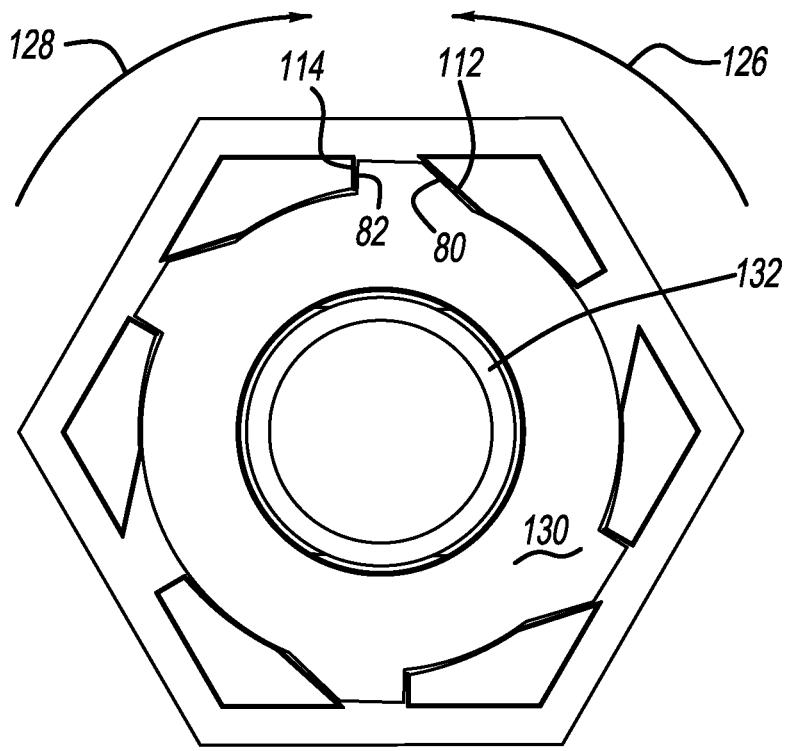
FIG. 14 is a simplified, cross-sectional view of the four-piece locking embodiment of FIG. 10, showing engagement of the nut middle ratchet gears and the slip section posts.

FIG. 14 is a simplified, cross-sectional view of locking nut 24b, showing engagement of the nut middle ratchet gears and the slip section posts. While the nut middle 42a of locking nut 24a is implemented as an upper nut middle and a lower nut middle in locking nut 24b, the operation is substantially the same as set forth above in connection with FIG. 9, and thus for brevity's sake, the reader is referred to such description.

Figure 15A:
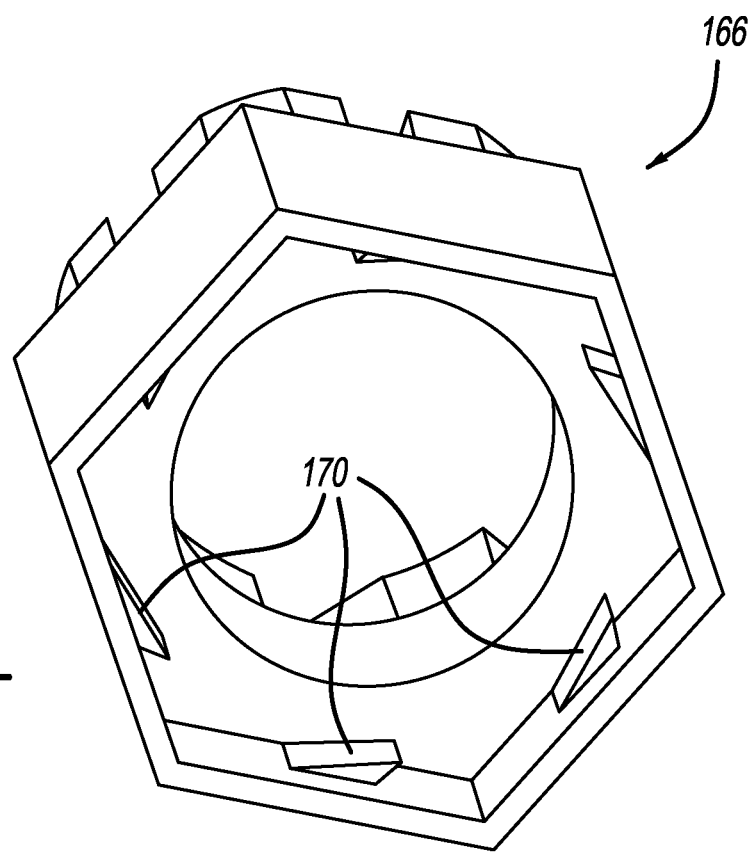
FIGS. 15A-15C are isometric views of a first embodiment of a sound indicating means respectively showing a plurality of first teeth disposed on the slip section, a plurality of second teeth disposed on the lower nut middle, and the first teeth in relation to the second teeth when the slip section is assembled with the lower nut middle.
Figure 15B:
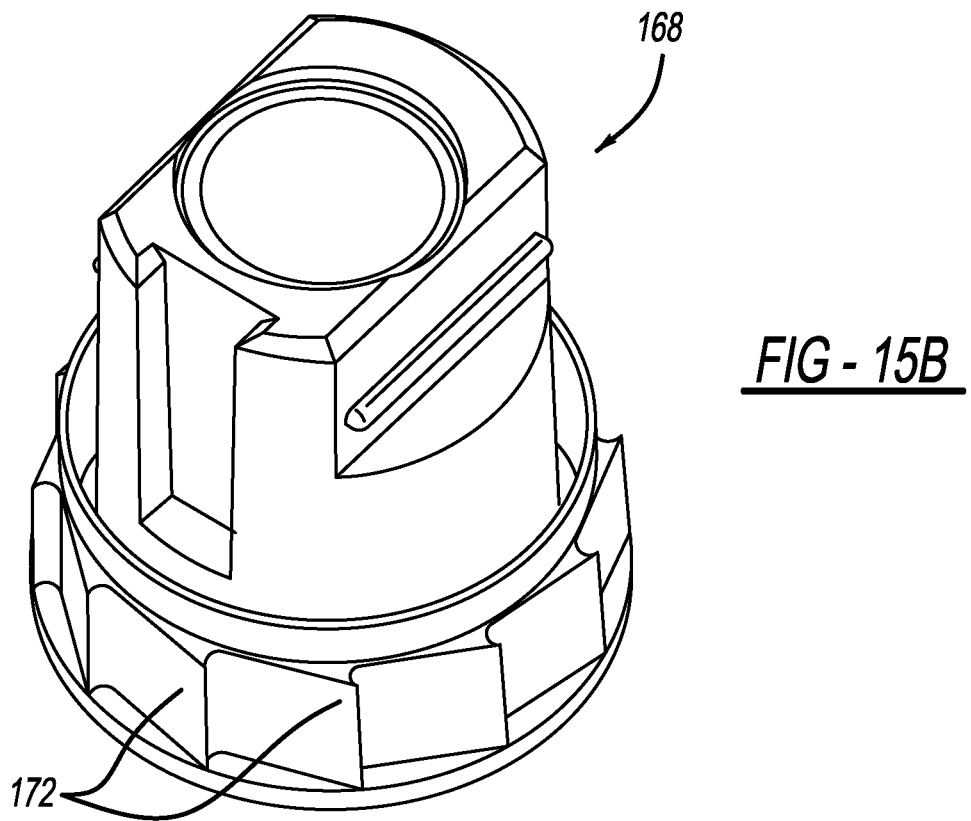
Figure 15C:
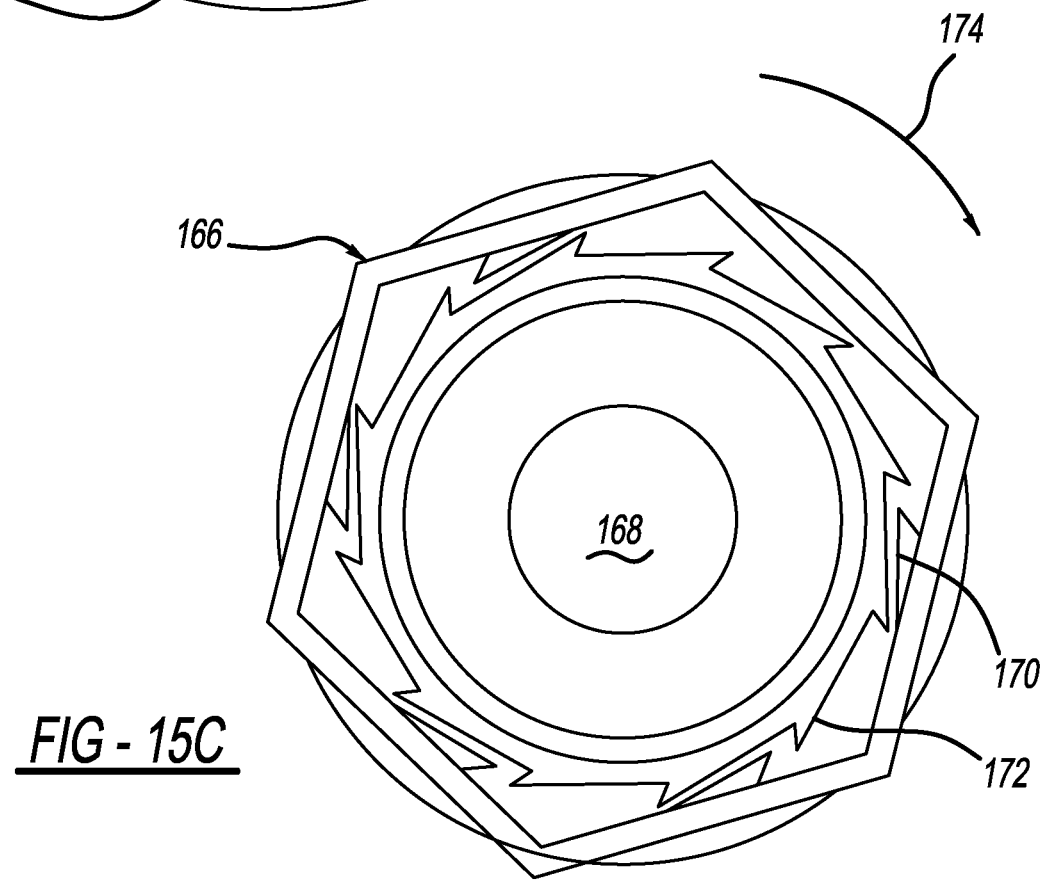

FIGS. 15A-15C are isometric views of a first embodiment of a sound indicating means for aurally indicating when the slip section rotates relative to said nut middle, which operates to add a user discernible sound when the torque-slip function is actuated. In the first embodiment of the sound indicating means, companion sets of teeth are added to the lower nut bottom and the slip section. In this regard, FIG. 15A shows a modified slip section—designated slip section 166—which is similar to slip section 44b except for the addition of a plurality of first teeth 170. Additionally, FIG. 15B shows a modified lower nut middle—designated lower nut middle 168—which is similar to lower nut middle 132 except for the addition of a plurality of second teeth 172.

FIG. 15C shows the slip section 166 and lower nut middle 168 as assembled, with the plurality of first teeth 170 in relation to the plurality of second teeth 172. The slip section 166 and the lower nut middle 168 generally rotate together when the locking nut is being tightened, except when a torque threshold has been reached, in which case the slip section rotates relative to the lower nut middle. For example, rotation of the slip section in direction 174 may result in relative rotation during torque-slip, in which case teeth 170 contact and pass over teeth 168, resulting in an audible "click" or the like. This sound indication can be understood by the user to mean that the locking nut has been sufficiently tightened/torqued.

Figures 16A, 16B:
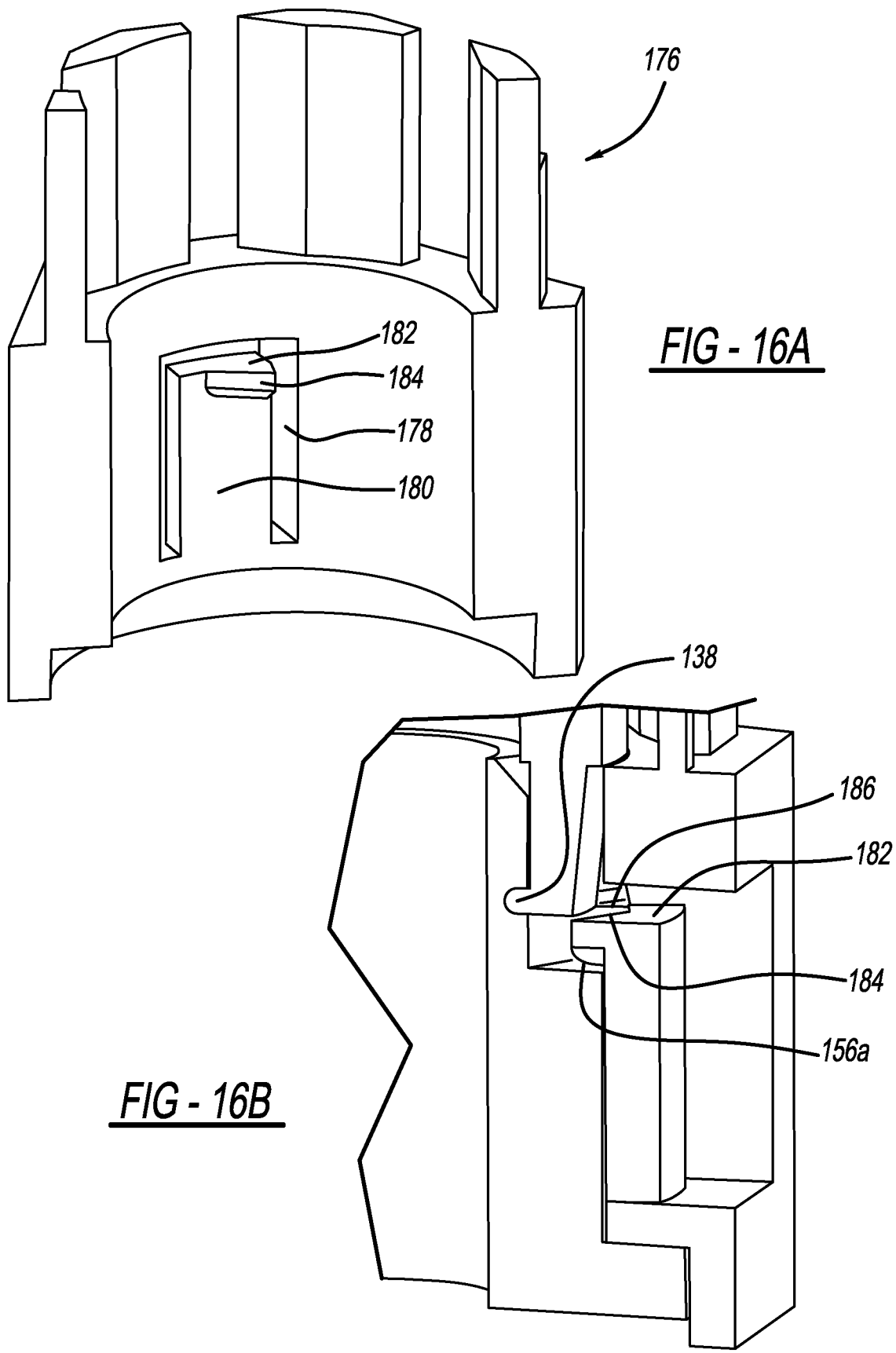
FIGS. 16A-16C are isometric views of a second embodiment of a sound indicating means respectively showing a cantilever disposed on the slip section, an edge feature formed on the lower nut middle, and the cantilever engaging the edge feature during slip.
Figure 16C:
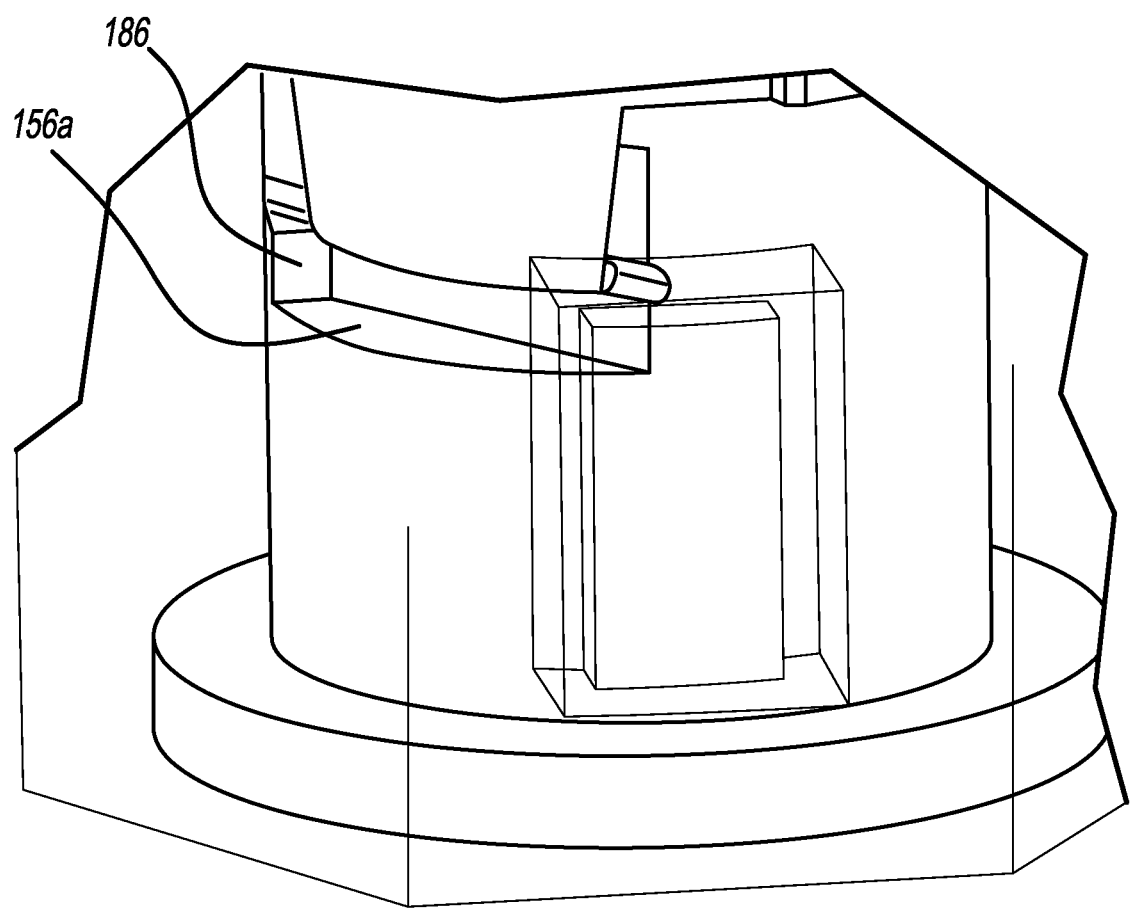

FIGS. 16A-16C are isometric views of a second embodiment of a sound indicating means. In this second embodiment, FIG. 16A shows a modified slip section—designated slip section 176—which is similar to slip section 44b except for the addition of a free-standing cantilever 180 formed in a sidewall 178 of the slip section. The cantilever 180 includes a strike member 182 at a free end thereof, which in turn has a strike surface 184. The cantilever 180 is one part of the sound indicating means in this second embodiment.

FIG. 16B shows a modified lower nut middle, which is modified relative to lower nut middle 132 with respect to horizontal stop surface 156. More particularly, surface 156 has been lowered in general and is now designated surface 156a. However, a small section remains unmodified, resulting in a newly formed edge section 186. Relative rotation of the slip section 176 relative to the lower nut middle 132 means that the torque-slip function has been actuated. In this case, the relative rotation will result in the strike surface 184 of the cantilever 180 sequentially engaging edge sections 186 as relative rotation progresses.

Figure 17A:
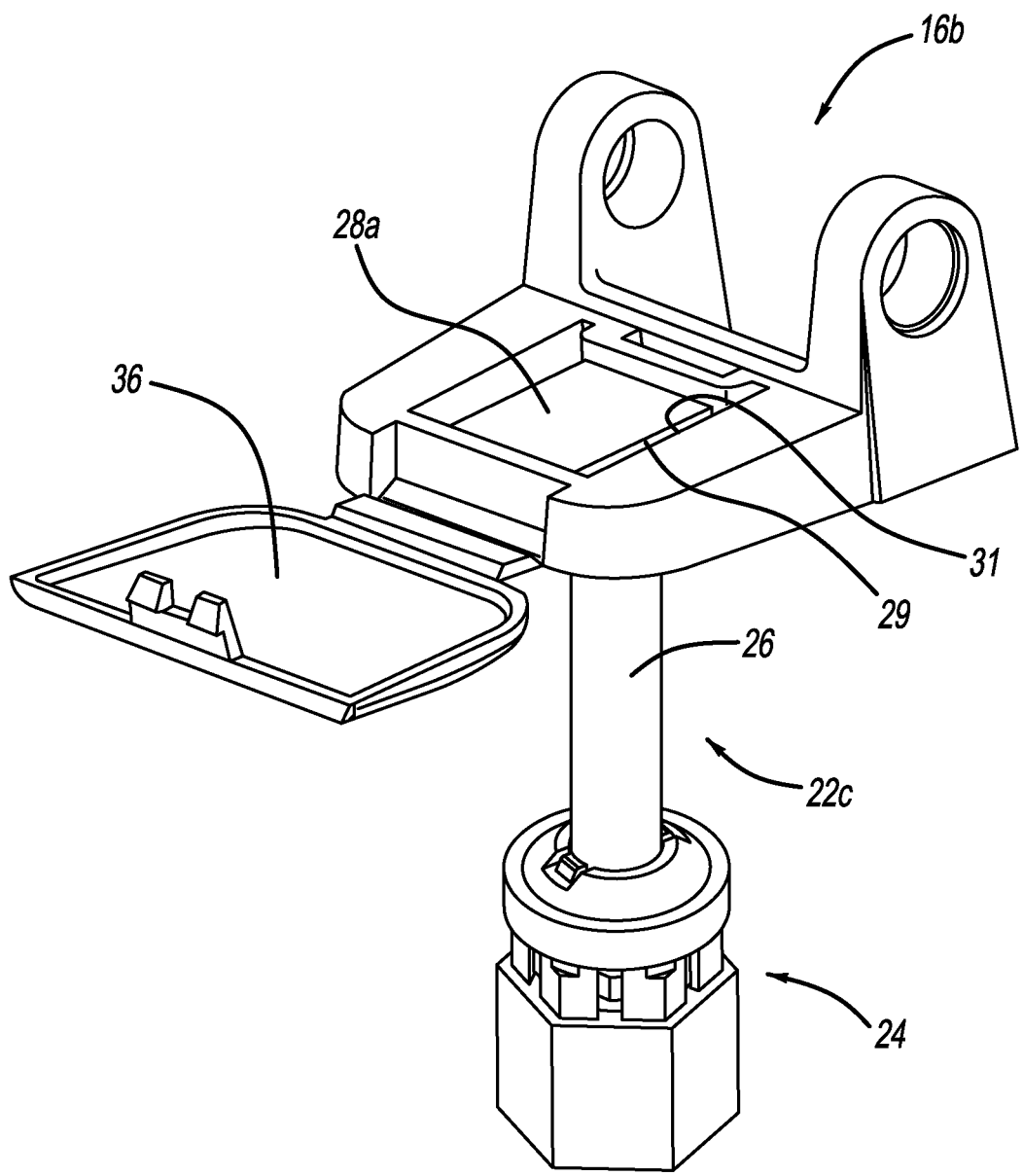
FIGS. 17A-17B are isometric views showing a further embodiment of a bolt and the top-mount hinge of FIGS. 3-4 in connection with a locking nut according to an embodiment, wherein the bolt includes an enlarged head configured to cooperate with the sidewalls of the compartment of the top-mount hinge, eliminating the need for the bolt washer of FIGS. 3-4.
Figure 17B:
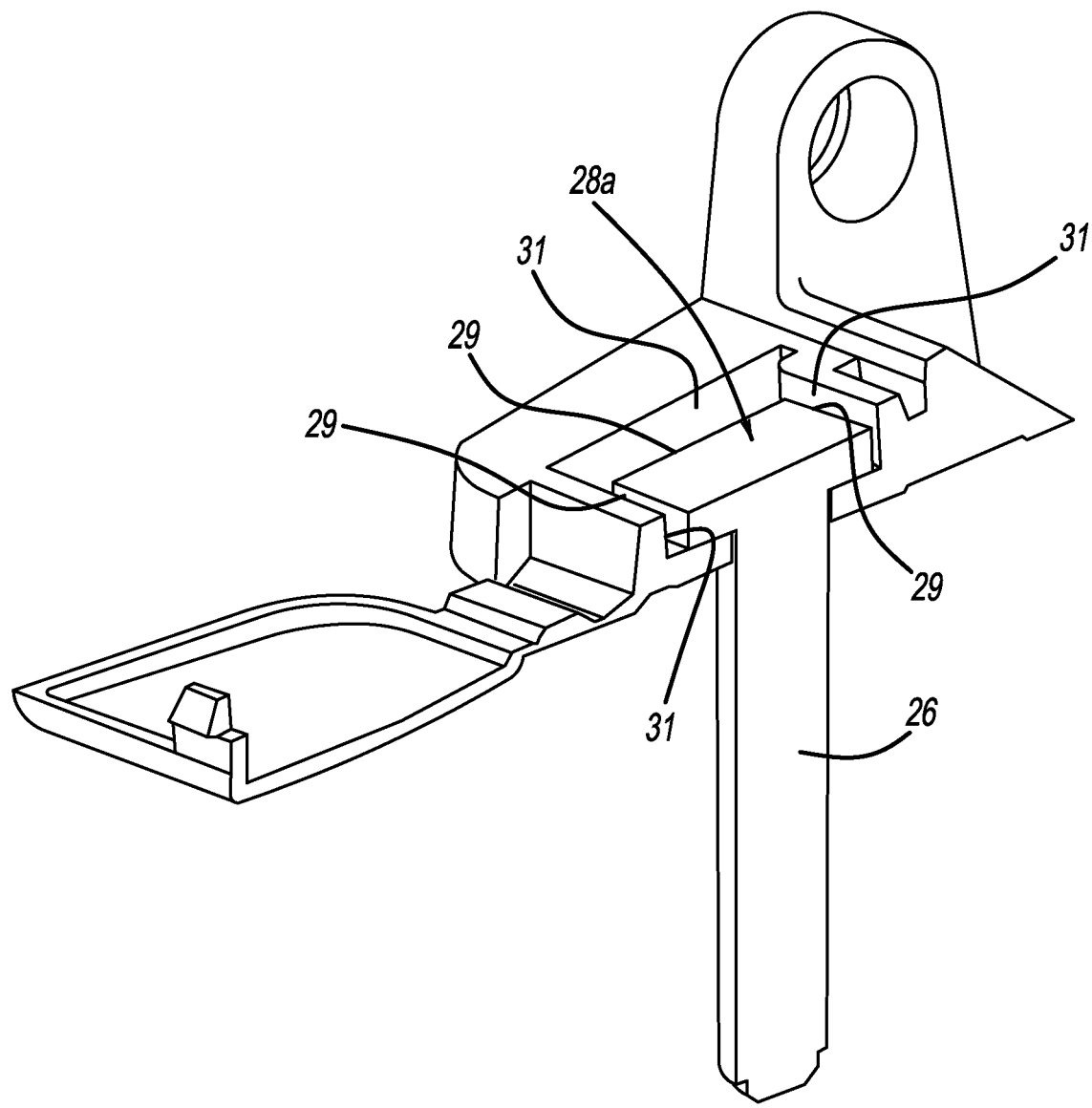

FIGS. 17A-17B show the locking nut 24 as used to secure a bolt 22c of the type that is suitable to work with the top-mount hinge 16b having a through-hole through which the bolt 22c passes. Bolt 22c includes a threaded shank 26 extending along a longitudinal axis, and an enlarged head 28a. As shown, the shank 26 can be constructed with external (male) threads that are configured to cooperate with locking nut 24 having corresponding internal (female) threads.

In the illustrated embodiment, the through-hole described above will allow the bolt 22c to pass therethrough. However, the enlarged head 28a includes surfaces 29 that are configured to cooperate with corresponding surfaces 31 of the inside compartment of the top-mount hinge 16b to impede and/or prevent free rotation of the bolt 22c relative to the top-mount hinge when the locking nut 24 is being tightening, provided the head 28a is seated in the compartment so that the surfaces 29, 31 face each other and thus engage (and interfere) to prevent rotation. It should be understood, however, that other configurations (e.g., shapes) may be used to accomplish the same function. In the illustrated embodiment, the top-mount hinge 16b also includes closure 36 hinged to close the compartment of hinge 16b that houses the head 28a of bolt 22c.

Although only certain embodiments have been described above with a certain degree of particularity, those skilled in the art could make numerous alterations to the disclosed embodiments without departing from the scope of this disclosure. All directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments. Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other.

While one or more particular embodiments have been shown and described, it will be understood by those of skill in the art that various changes and modifications can be made without departing from the spirit and scope of the present teachings.

What is claimed is:

1. An apparatus having a longitudinal axis associated therewith and configured to secure a threaded bolt to a toilet bowl, comprising:
  a nut top including an aperture disposed along said axis and having an inclined surface on a first axial side and an outer wall axially-extending on a second axial side;
  a nut middle having a threaded through-bore extending along said axis that is configured to mesh with the threaded bolt, said nut middle including a plurality of circumferentially-arranged ratchet gears on an outer surface thereof, each of said ratchet gears including a respective first slip surface and a respective first drive surface; and a slip section having a cylindrical-shaped body with an opening in which a portion of said nut middle is disposed, said slip section including a plurality of axially-extending and circumferentially-arranged posts, each post having a respective free end disposed radially-inwardly of said outer wall of said nut top, each post having a respective second slip surface and a respective second drive surface, wherein in a first state, said first slip surfaces of said ratchet gears engage said second slip surfaces of said posts and said first drive surfaces of said ratchet gears engage said second drive surfaces of said posts, wherein in a second state when a first torque in a first rotational orientation applied to said slip section relative to said nut middle reaches a predetermined threshold, said second slip surfaces of said posts slide relative to, over and off of said first slip surfaces of said ratchet gears, wherein in a third state when a second torque in a second rotational orientation opposite of said first rotational orientation applied to said slip section relative to said nut middle, said second drive surfaces of said posts engage said first drive surfaces of said ratchet gears to rotate said nut middle.

2. The apparatus of claim 1 wherein said nut top includes a keying slot and a ledge adjacent said slot, said nut middle including at least one upper retaining clasp including a leg axially-extending in a first axial direction and terminating on a free end thereof in a foot with an overhanging lip, said at least one upper retaining clasp extending through said keying slot wherein said lip engages said ledge to retain said nut top to said nut middle.

3. The apparatus of claim 2 wherein said at least one upper retaining clasp is a first upper retaining clasp, said nut middle further including a second upper retaining clasp extending through said keying slot to retain said nut top to said nut middle, said first upper retaining clasp and said upper second retaining clasp being diametrically opposed.

4. The apparatus of claim 1 wherein said nut top further includes a land radially-outward of said inclined surface.

5. The apparatus of claim 1 wherein said nut top further includes a plurality of first segments axially-projecting from said second axial side, said plurality of first segments being separated by a plurality of intervening first slots, said nut middle including a plurality of second segments separated by intervening second slots, said first segments of said nut top being disposed in said second slots and said second segments of said nut middle being disposed in said first slots.

6. The apparatus of claim 1 wherein said nut middle further includes at least one lower retaining clasp including a leg axially-extending and terminating on a free end thereof in a foot with an overhanging lip, said at least one lower retaining clasp extending through said opening of said slip section wherein said lip engages a retaining shoulder of said slip section to thereby coupled said nut middle and said slip section.

7. The apparatus of claim 6 wherein said lower retaining clasp is a first lower retaining clasp, said nut middle comprises a second lower retaining clasp coupled to said retaining shoulder.

8. The apparatus of claim 6 wherein said slip section includes a radially-inwardly extending guide surface in said central opening.

9. The apparatus of claim 1 wherein an outer surface said slip section is configured with a plurality of generally flat surfaces.

10. The apparatus of claim 1 wherein said second slip surfaces and said second drive surfaces of said posts of said slip section are radially-inwardly facing, each of said posts as said respective free end further include a respective radially-outwardly facing notch.

11. The apparatus of claim 1 wherein said nut middle includes an upper nut middle and a lower nut middle.

12. The apparatus of claim 11 wherein said upper nut middle includes at least one coupling clasp with a first coupling feature and said lower nut middle include at least a second coupling feature complementary to the first coupling feature wherein said first coupling feature of said coupling clasp cooperates with the second coupling feature of said upper nut middle to couple said upper nut middle and said lower nut.

13. The apparatus of claim 12 wherein said coupling clasp is a first coupling clasp, said upper nut middle further including a second coupling clasp.

14. The apparatus of claim 11 wherein said slip section includes a shoulder adjacent said central opening, said lower nut middle including a flange.

15. The apparatus of claim 1 further comprising means for aurally indicating when said slip section rotates relative to said nut middle.

16. The apparatus of claim 15 wherein said aural indicating means comprises:
a plurality of first teeth wherein said slip section includes an outermost wall extending in a first axial direction opposite a second axial direction in which said posts extend, said plurality of first teeth being radially-inwardly projecting from an inner surface of said outermost wall; and
a plurality of second teeth disposed radially-outwardly from said nut middle and axially-opposed of said plurality of first teeth, wherein said relative rotation of said slip section causes said plurality of first teeth of said slip section to contact and override said plurality of second teeth of said nut middle causing said aural indication.

17. The apparatus of claim 15 wherein said aural indicating means comprises:
a cantilever disposed in a sidewall of said slip section, said cantilever axially extending from a first end to a second, free end at which is disposed a radially-inwardly projecting strike member;
a plurality of edges defining transitions between an outer, generally cylindrical surface of said nut middle and axially-extending surfaces of said nut middle that are substantially parallel to said longitudinal axis,
wherein relative rotation of said slip section causes said strike member to pass over one or more of said edges so as to cause said aural indication.

18. A system for securing a top-mount hinge to a toilet bowl wherein said hinge includes a compartment having a hole extending through a bottom wall thereof, comprising:
a bolt having a threaded shank and an enlarged head, said shank being configured in size to pass through said hole and said head being larger than said hole so as to prevent said head from passing through said hole; and
a lock nut having a longitudinal axis associated therewith and configured to secure said threaded bolt to the toilet bowl wherein said lock nut comprises:
a nut top including an aperture disposed along said axis and having an inclined surface on a first axial side and an outer wall axially-extending on a second axial side;
a nut middle having a threaded through-bore extending along said axis that is configured to mesh with the threaded bolt, said nut middle including a plurality of circumferentially-arranged ratchet gears on an outer surface thereof, each of said ratchet gears including a respective first slip surface and a respective first drive surface; and a slip section having a cylindrical-shaped body with an opening in which a portion of said nut middle is disposed, said slip section including a plurality of axially-extending and circumferentially-arranged posts, each post having a respective free end disposed radially-inwardly of said outer wall of said nut top, each post having a respective second slip surface and a respective second drive surface, wherein in a first state, said first slip surfaces of said ratchet gears engage said second slip surfaces of said posts and said first drive surfaces of said ratchet gears engage said second drive surfaces of said posts, wherein in a second state when a first torque in a first rotational orientation applied to said slip section relative to said nut middle reaches a predetermined threshold, said second slip surfaces of said posts slide relative to, over and off of said first slip surfaces of said ratchet gears, wherein in a third state when a second torque in a second rotational orientation opposite of said first rotational orientation applied to said slip section relative to said nut middle, said second drive surfaces of said posts engage said first drive surfaces of said ratchet gears to rotate said nut middle.

19. The system of claim 18 wherein said compartment of said top-mount hinge includes a first plurality of sidewall, substantially flat surfaces, said enlarged head of said bolt including a second plurality of flat surfaces configured to face said first plurality of said sidewall, flat surfaces so as to impede rotation of said bolt relative to said top-mount hinge.

20. The system of claim 18 wherein said compartment of said top-mount hinge includes a first plurality of sidewall, substantially flat surfaces, said enlarged head of said bolt including a second plurality of flat surfaces, said system further comprising a bolt washer having a central aperture with a third plurality of flat surfaces facing inwardly, and a fourth plurality of flat surface facing outwardly, wherein said first and fourth plurality of flat surfaces face each other and interfere so as to impede relative rotation of said bolt washer relative to said top-mount hinge;

wherein said second and third plurality of flat surface face each other and interfere so as to impede relative rotation of said bolt relative to said bolt washer;

whereby said first, second, third, and fourth plurality of flat surfaces impede said bolt from rotation relative to said top-mount hinge.

* * * * *